US011281932B2

(12) United States Patent
Clarke et al.

(10) Patent No.: US 11,281,932 B2
(45) Date of Patent: Mar. 22, 2022

(54) SYSTEM AND METHOD FOR MANAGING LOYALTY SCHEME DATA

(71) Applicant: Loyalty Angels Ltd, Bagshot (GB)

(72) Inventors: Lee David Clarke, Ascot (GB);
Gregory Peter Gormley, Woking (GB)

(73) Assignee: Loyalty Angels Ltd, Bagshot (GB)

( * ) Notice: Subject to any disclaimer, the term of this patent is extended or adjusted under 35 U.S.C. 154(b) by 0 days.

(21) Appl. No.: 15/931,283

(22) Filed: May 13, 2020

(65) Prior Publication Data

US 2020/0272846 A1 Aug. 27, 2020

Related U.S. Application Data

(63) Continuation of application No. 15/778,594, filed as application No. PCT/GB2016/053685 on Nov. 23, 2016, now Pat. No. 10,713,526.

(30) Foreign Application Priority Data

Nov. 23, 2015 (GB) ...................................... 1520654
Oct. 5, 2016 (GB) ...................................... 1616927

(51) Int. Cl.
*G06K 9/62* (2006.01)
*G06F 16/9537* (2019.01)
(Continued)

(52) U.S. Cl.
CPC ....... *G06K 9/6202* (2013.01); *G06F 16/9537* (2019.01); *G06K 7/1413* (2013.01);
(Continued)

(58) Field of Classification Search
CPC .. G06K 9/6202; G06K 7/1413; G06K 9/3208; G06K 9/4604; G06K 2209/01;
(Continued)

(56) References Cited

U.S. PATENT DOCUMENTS 10,360,592 B1 * 7/2019 Emigh ............... G06Q 30/0224
10,671,980 B2 * 6/2020 Lacoss-Arnold ...........................
G06Q 20/3821
(Continued)

OTHER PUBLICATIONS

International Patent Application No. PCT/GB2016/053685; Int'l Written Opinion and the Search Report; dated Mar. 16, 2017; 10 pages.

*Primary Examiner* — Neil R McLean
(74) *Attorney, Agent, or Firm* — BakerHostetler

(57) ABSTRACT

A data extraction system for extracting a unique identifier from a plurality of different types of tokens, the data extraction system comprising a central processing system arranged to receive a data string representing an image of the token, the central processing system comprises: a data store of predetermined data records relating to the plurality of different types of token, each predetermined data record including a plurality of discrete features derived from an image of each type of token; a token type recognition module for identifying a type of token which the representation relates to, the recognition module comprising: a discrete feature identifier for iteratively identifying discrete features present in the representation; and a matching engine for iteratively comparing each of the identified features with each of the discrete features of the plurality of different types of token stored in the data store and registering each matched feature; wherein the recognition module is arranged to compare a current number of registered matched features of the representation with a predetermined number of minimum matched features and when the current number of registered matched features is at least equal to the at least the predetermined number of minimum matched features to determine which type of token the representation relates to; a data extractor for extracting at least one unique identifier of the token from the representation, wherein the data
(Continued)

extractor is arranged to use the type of token identified by the token type recognition module to locate a region of the representation where the unique identifier is provided and to focus a data extraction process at that region.

20 Claims, 18 Drawing Sheets

(51) Int. Cl.
  *G06Q 20/32* (2012.01)
  *G06K 7/14* (2006.01)
  *G06K 9/32* (2006.01)
  *G06K 9/46* (2006.01)
  *G06Q 30/02* (2012.01)

(52) U.S. Cl.
  CPC ......... *G06K 9/3208* (2013.01); *G06K 9/4604* (2013.01); *G06Q 20/3276* (2013.01); *G06Q 30/0226* (2013.01); *G06K 2209/01* (2013.01); *G06Q 30/0229* (2013.01)

(58) Field of Classification Search
  CPC ............ G06F 16/9537; G06Q 30/0226; G06Q 20/3276; G06Q 30/0229
  See application file for complete search history.

(56) References Cited

U.S. PATENT DOCUMENTS

| | | | |
|---|---|---|---|
| 2005/0097048 A1 | 5/2005 | Hassanein et al. | |
| 2012/0005076 A1* | 1/2012 | Dessert | G06Q 20/32 705/39 |
| 2012/0185393 A1 | 7/2012 | Atsmon et al. | |
| 2014/0032347 A1* | 1/2014 | Argue | G06Q 20/209 705/21 |
| 2014/0330631 A1* | 11/2014 | Wesley | G06Q 20/20 705/14.33 |
| 2015/0019944 A1* | 1/2015 | Kalgi | H04L 67/20 715/205 |
| 2015/0278805 A1 | 10/2015 | Spencer, III et al. | |
| 2016/0019530 A1* | 1/2016 | Wang | G06Q 20/34 705/39 |
| 2016/0364713 A1* | 12/2016 | Kingsborough | G06Q 30/0209 |

\* cited by examiner

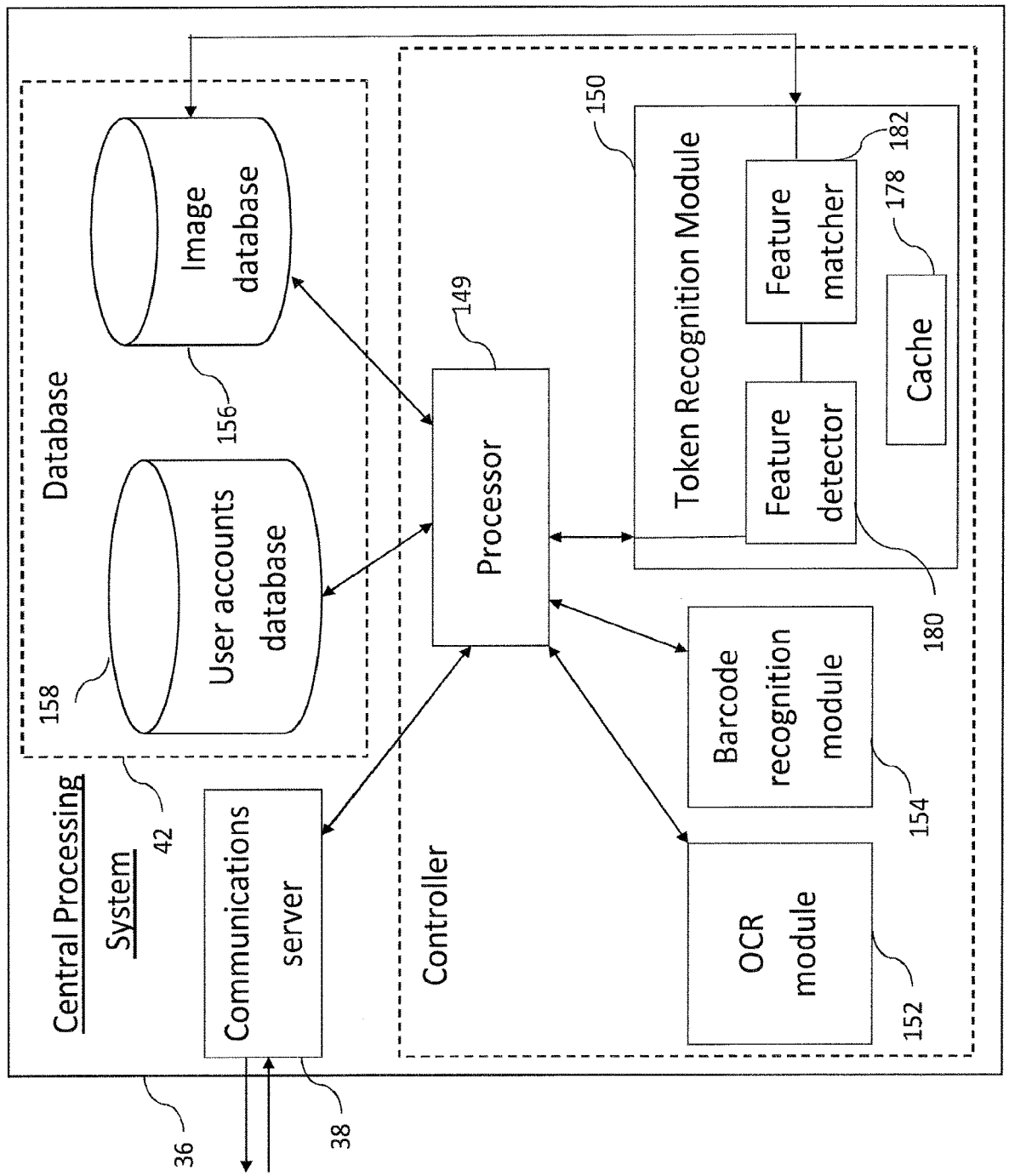

SYSTEM AND METHOD FOR MANAGING LOYALTY SCHEME DATA

CROSS-REFERENCE TO RELATED APPLICATIONS

The present application is a continuation of U.S. patent application Ser. No. 15/778,594 filed May 23, 2018, which is a 371 National Stage of International Patent Application No. PCT/GB2016/053685 filed Nov. 23, 2016, which claims priority benefit of UK Patent App. No. 1520654.3, filed on 23 Nov. 2015 and UK Patent App. No. 1616927.8, filed on 5 Oct. 2016, each hereby incorporated by reference in their entirety.

TECHNICAL FIELD

The present invention relates to a method of and system for data extraction and more particularly, though not exclusively, to an improved relatively fast method of and system for data extraction from a plurality of different types of user tokens where each different type of user token has a different data presentation format. As such, the present invention is directed to type of aggregation system for unifying and simplifying user interaction with hundreds/thousands of different legacy data management systems which have been designed and operated independently.

BACKGROUND

Many different types of user-interaction and processing system exist. They are used in a host of diverse industries for many different purposes. Most of these are directed towards facilitating user interaction with a distributed system often in dispersed geographic locations to enable a function to occur. For example, different transport systems may have different user tokens (tickets) to enable a user to travel geographically between two different locations. Similarly, automated biometric identity systems exist to verify the identity of a person carrying a biometric passport before granting entry into a different country. Also transactions in goods and services using a bank-issued user token (payment card for example) can also be carried out in geographically-spaced apart locations with central authentication of the user token presented by the user to support the desired transaction.

Other types of system enable user interaction to be monitored and tracked to provide data relating to user behaviour with a geographically distributed system to be captured. To encourage this type of behaviour, users can be provided with user tokens which accrue benefits for repeated use. One example of this is a loyalty card programme system which allows retailers to reward loyal customers. In essence, when a purchase is made and the relevant loyalty card is presented, a reward (for example points) is given to the customer that may be relative to the cost of the purchase, or otherwise be linked to the purchase transaction. Over time a customer can amass enough points to be able to 'spend' some or all of their points according to an equivalent monetary value or redeem them against certain items.

Given the number of different types of system which are present in even just one type of industry there is a desire to aggregate these different systems to prevent the user from having to carry a multitude of different types of user token to facilitate interaction with the different types of systems they will need to interact with each day. One way in which the different types of systems can be integrated is by the integration of the system's back end, which can reduce processing issues and speed up the reconciliation of interactions with the system. However, whilst such systems simplify the processing task for the service provider, they do not solve the problem from the user's perspective.

Other systems impose a standard to the data presentation format on the user token. For example in a payment token (for example a credit/debit bank card) the location and format of relevant data provided on the user token can be standardised such that a myriad of different devices can be configured to the standard to read that data present on the token and identify not only the type of user token but also specific information unique to the owner of that user token, for example a user identifier. Looking more closely at this data presentation format standardisation and referring to FIG. 1, it can be seen that a payment card 10 has a standardised layout. All payment cards have the same dimensions and include both a long Primary Account Number (PAN) 12 and an expiration date 14, signifying the month and year in mm/yy format after which the card 10 ceases to be valid and can no longer be used. The PAN 12 always extends across the card 10 just beneath the central longitudinal axis of the card 10 and comprises a sequence of 16 numbers split into 4 sections. The provider of the payment card 10 can be identified from the first few numbers of the PAN 12. The expiration date 14 is found beneath the PAN 12. All payment cards conform to this standard. Payment cards may also incorporate a cardholder name 16, a bank name 18 and a chip 20 among other information, though these can vary in operation and data presentation for example location on the payment card 10.

The standard layout of payment cards in this way allows for swift recognition of a payment card in many different types of systems which provide goods and services for example a car-park ticket payment machine or a general a point of sale terminal at a retail outlet. The PAN and expiration data, along with the chip and layout are easily recognisable in an image of this type of user token in order to identify the user token as a payment card. This is an example of what is called a 'common format' for presentation of the data relating to the user token, namely one that does not change between different systems and so is easy to read.

However, of the other types of systems for which user tokens are necessary, there are a large variety of different formats used because they relate to independent systems that were never designed to work together. An example of this is a loyalty program user token and system described above. This type of user token has what is termed an 'uncommon format' namely one in which each different type of user token presents data in a manner which is different for each different type of system, making it very difficult for a single system to read all of the different types of user tokens.

In these systems a single user may have to carry a large number of loyalty cards with them at all times. This inconvenience has led to the development of software applications that allow a user to view their loyalty cards and points balances in a digital wallet system, for example on a smartphone. These applications therefore reduce the number of cards it is necessary for a user to carry at any one time to those that are supported by the digital wallet. Thus, loyalty cards can be replaced with a computing device, such as a smartphone or tablet as an aggregator of these user tokens.

Typically, these applications require a large amount of manual data input prior to use that is time consuming and so a deterrent to the user. If data input to the application is too onerous, some users may not engage with the application fully, and will not gain the full benefit of the application and of their chosen loyalty card programmes. The loyalty scheme information to be manually inputted is likely to be both lengthy and numerical, and this introduces a potential for human error. Entering a wrong number may lead to errors in data retrieval, more frustration and time spent inputting the data, or, in a worse case, points earned by the user being transferred to a stranger.

These applications also require the user to present the device on which the application is running (and on which the data associated with the relevant loyalty scheme is stored) at the point of sale in order to accumulate loyalty points. While the number of cards a user must carry is thereby reduced, the user is still obliged to present a barcode or other identifier on the device to gain loyalty points. In the event that the application is not accessible, no loyalty points can be gained and the system cannot track the user interaction which is one of the primary functions of the system.

It is against this background that the present invention has been devised.

SUMMARY OF THE INVENTION

According to an aspect of the present invention there is provided a data extraction processing system for extracting a unique identifier from a plurality of different types of tokens, each different type of token having a different data presentation format, the data extraction processing system comprising: a data store of predetermined data records relating to the plurality of different types of token, each predetermined data record including a plurality of discrete features derived from an image of each type of token; a pre-processing controller for construction a representation of the image captured by the camera using the data string received from the mobile telecommunications device, a token type recognition module for identifying a type of token which the representation relates to, the recognition module comprising: a discrete feature identifier for iteratively identifying discrete features present in the representation; and a matching engine for iteratively comparing each of the identified features with each of the discrete features of the plurality of different types of token stored in the data store and registering each matched feature; wherein the recognition module is arranged to compare a current number of registered matched features of the representation with a predetermined number of minimum matched features and when the current number of registered match features is at least equal to the at least the predetermined number of minimum matched features to determine which type of token the representation relates to; a data extractor for extracting at least one unique identifier of the token from the representation, wherein the data extractor is arranged to use the type of token identified by the token type recognition module to locate a region of the representation where the unique identifier is provided and to focus a data extraction process at that region.

The above aspect provides a fast, efficient and reliable system which can recognise user tokens having an uncommon format. The use of feature matching and feature counting as opposed to conventional image comparison techniques not only improves the speed of token identification but also increases the reliability of process, namely the percentage ability to correctly identify the user token having an uncommon format in various image capture environments. This is critical for situations where users take images of their own user tokens such that there is no control of the conditions under which the image for comparison purposes is taken. The present embodiments advantageously are extremely tolerant of the variable image capture conditions, variable orientation of the images captured and also of images of only part of the user token being taken. Conventional image comparisons techniques are highly intolerant of such variations.

According to another aspect of the embodiments, there is provided a data extraction processing system for extracting a unique identifier from one of a plurality of different types of tokens, each different type of token having a different data presentation format, the data extraction processing system comprising: a data store of predetermined data records relating to the plurality of different types of token, each predetermined data record including a plurality of discrete features derived from an image of each type of token; a pre-processing controller for constructing a representation of an image captured by a camera of a mobile telecommunications device, a token type recognition module for identifying a type of token which the representation relates to, the recognition module comprising: a discrete feature identifier for iteratively identifying discrete features present in the representation; and a matching engine for iteratively comparing each of the identified features with each of the discrete features of the plurality of different types of token stored in the data store and registering each matched feature; wherein the recognition module is arranged to compare a current number of registered matched features of the representation with a predetermined number of minimum matched features and when the current number of registered match features is at least equal to the predetermined number of minimum matched features, to determine which type of token the representation relates to, and a data extractor for extracting at least one unique identifier of the token from the representation, wherein the data extractor is arranged to use the type of token identified by the token type recognition module to locate a region of the representation where the unique identifier is provided and to focus a data extraction process at that region.

According to another aspect of the embodiments, there is provided a method of extracting a unique identifier from one of a plurality of different types of tokens, each different type of token having a different data presentation format, the method comprising: capturing an image of a token using a mobile telecommunications device; processing the captured image into a data string; and transmitting the data string from the mobile telecommunications device to a central processing system, at a central processing system: providing a data store of predetermined data records relating to the plurality of different types of token, each predetermined data record including a plurality of discrete features derived from an image of each type of token; constructing a representation of the captured image using the data string, identifying a type of token which the representation relates to, the identifying step comprising: iteratively identifying discrete features present in the representation; iteratively comparing each of the identified features with each of the discrete features of the plurality of different types of token stored in the data store; and registering each matched feature; wherein the identifying step includes comparing a current number of registered matched features of the representation with a predetermined number of minimum matched features and when the current number of registered match features is at least equal to the predetermined number of minimum matched features, determining which type of token the representation relates to; and extracting at least one unique identifier of the token from the representation, the extracting step including locating a region of the representation where the unique identifier is provided using the type of token identified and focussing a data extraction process at that region.

The present embodiments also extend to a method of extracting a unique identifier from one of a plurality of different types of tokens, each different type of token having a different data presentation format, the extraction method comprising: providing a data store of predetermined data records relating to the plurality of different types of token, each predetermined data record including a plurality of discrete features derived from an image of each type of token; constructing a representation of an image captured by a camera of a mobile telecommunications device; identifying a type of token which the representation relates to, the identifying step comprising: iteratively identifying discrete features present in the representation; and iteratively comparing each of the identified features with each of the discrete features of the plurality of different types of token stored in the data store; and registering each matched feature; wherein the identifying step includes comparing a current number of registered matched features of the representation with a predetermined number of minimum matched features and when the current number of registered match features is at least equal to the predetermined number of minimum matched features, to determine which type of token the representation relates to; and extracting at least one unique identifier of the token from the representation, the extracting step including locating a region of the representation where the unique identifier is provided using the type of token identified and focussing a data extraction process at that region.

Another different aspect of the present embodiments is a method of extracting a unique identifier from one of a plurality of different types of tokens, each different type of token having a different data presentation format, the method comprising: capturing an image of a token using a mobile telecommunications device; commencing a common format token recognition process and a uncommon format token recognition processes in parallel on the mobile device, determining which token recognition process identifies a positive match with a known type of token first; terminating the token recognition process which has not yet identified a positive match; extracting at least one unique identifier of the token from the image based on knowledge of the unique identifier location associated with that type of token.

This dual-scanning method of determining unique identifier extraction is advantageous because it enables the mobile device to be agnostic as to the type of token being presented. Also, rather than having to go through these different types of recognition processes sequentially which takes more time, running them in parallel and terminating the slowest process when a match is found enables the overall process to be faster and easier for the user.

According to another aspect of the present embodiments there is provided a token management system for linking together the operation of payment tokens having a common format and loyalty user tokens having an uncommon format, the system comprising a data extraction processing system for extracting unique identifier information from the loyalty token and a storing the same in a data record in a user account database, and an updating system for reading the unique identifier information from a payment token and storing the same in the data record, wherein the management system is arranged to receive information pertaining to a transaction involving the payment token, to use the data record to retrieve the loyalty token details and to send a transaction notifying message to a loyalty token issuing system for updating a user account held at the loyalty token issuing system.

The key advantage of linking together payment tokens and loyalty tokens is that the user does not have to have the loyalty token present at a transaction to enable the benefit of the transaction in terms of loyalty rewards to them to be realised.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 6a is a schematic block diagram of the processing system for use in the system of FIG. 2;

FIGS. 6b and 6c are schematic diagrams of databases used in the processing system of FIG. 6a;

DETAILED DESCRIPTION OF EMBODIMENTS

The methods and systems described herein relate to a computer program, such as an application, or app, that may be downloaded and installed onto a computer or user device. The program is downloaded from a server system by a user. It will be appreciated that, in alternative configurations, the computer program is sourced from an application store and/or content provider. For example, the content provider may comprise the Apple® Appstore® or the Google® Play Store.

The methods and systems described herein also relate to a data management system that is used in conjunction with the computer program. The computer program is therefore used as a user portal, creating an interface between the user and the data management system whereby information can be displayed to the user, and input to the data management system by the user. It will be appreciated that, in other configurations, the data management system operates without a computer program installed on a computer or user device.

Figure 1:
FIG. 1 is an example of a front face of a typical token having a common format.
Figure 2:
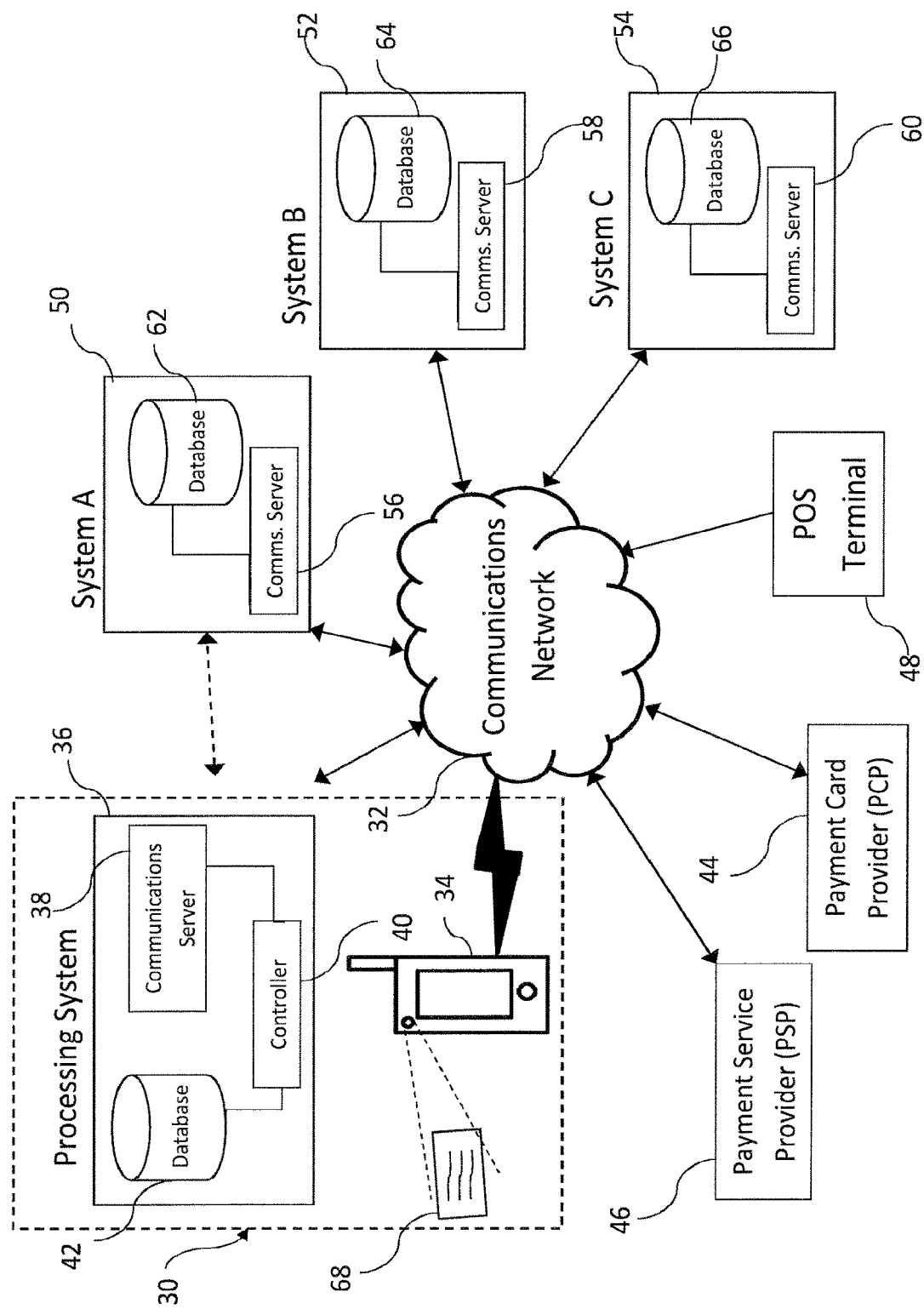
FIG. 2 is a schematic block diagram showing a system for implementing embodiments of the invention with a user token having an uncommon format, including a user device and a processing system.

As used herein, the term 'token' is used to refer to an object, the use and possession of which entitles the owner of the token to a particular benefit accessible to the owner by inspection or by reading information provided on or in the token into a terminal. Tokens may be combined with an authorization requirement such as password to access systems or data, or may be readable only to particular types of terminals or systems. Examples of tokens are functional cards such as payment cards, loyalty cards, smart cards, chip & pin cards, key fobs and dongles, A system 30 for implementing an embodiment of the invention is shown in FIG. 2. The system 30 uses a communications network 32, for example a wide-area network such as the Internet, which connects various parties involved in the implementation of the embodiment and provides network infrastructure for the exchange of data. The mobile device 34 (or user device) belonging to a respective user and running a consumer application (or an 'app'), which forms part of the system 30, is connected to the communications network 32 in order to upload data for processing to a central processing system 36 according to a method as described herein. The consumer application comprises an application interface that is used to gather data from the user, and to display data sent to the application by the central processing system 36 via the communications network 32.

Data input to the consumer application by the user can be uploaded via the communications network 32 to a centralized hub, (the central processing system 36) where it can be managed and processed. The central processing system 36 may receive data sent via the communications network 32 and provide data to other systems connected to the communications network 32. The central processing system 36 comprises a communications server 38, a controller 40 and a database 42. Data is received at the central processing system 36 by the communications server 38. The controller 40 is operatively coupled with the communications server 38 and the database 42. Data that is received by the central processing system 36, or data that is of use for the operation of the central processing system 36, may be stored in the database 42.

FIG. 2 further shows at least one payment card provider (PCP) 44 and at least one payment service provider (PSP) 46, at least one point of sale (POS) terminal 48 and systems A, B and C 50, 52, 54. Systems A, B and C 50, 52, 54 each comprise a respective communications server 56, 58, 60 and a database 62, 64, 66 and are systems associated with customer reward schemes, and/or with loyalty tokens. The PCP 44, PSP 46, POS terminal 48, and systems A to C 50, 52, 54 will be discussed in more detail later.

Together, the central processing system 36 and the user device 34 are capable of quickly and accurately identifying an unknown token 68 (namely a token having an uncommon format) belonging to a user, the user token 68 being in one embodiment associated with a loyalty or rewards scheme for example. Furthermore, the central processing system 36 and user device 34 are capable of accessing relevant information relating to a user associated with the user token 68, possibly in the form of a unique identifier, for example. This process is achieved by data capture at the user device 34, which is communicated via the communications network 32 to the central processing system 36, where the data relating to the user token 68 is processed and the token type and user-specific data associated with the user token 68 are identified.

Figure 3:
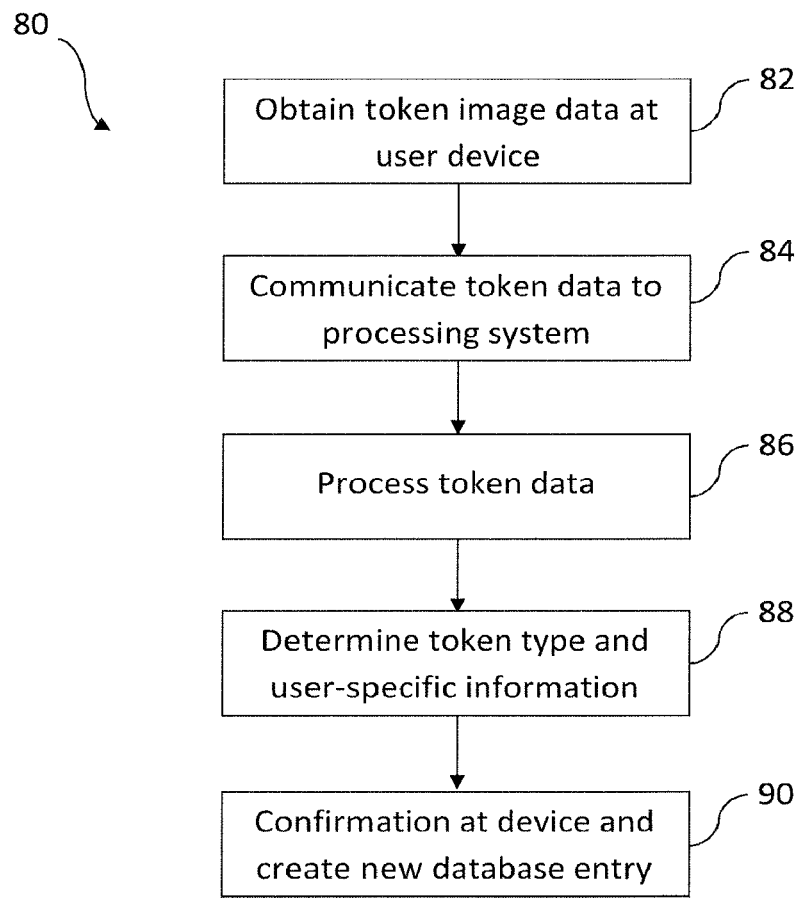
FIG. 3 is a flow chart outlining a method of obtaining token data using the system of FIG. 2.

FIG. 3 outlines the process 80 undertaken by the central processing system 36 and the user device 34 to identify the unknown token's type and its subsequently associated user-specific data. Referring to both FIGS. 2 and 3, token image data is obtained 82 via data capture at the user device 34. Using obtained 82 image data as opposed to manually entered data maximises efficiency of the system while reducing the potential for human error. In the method of FIG. 3, image data of the user token 68 is captured by the user device 34 and is subsequently communicated 84 to the central processing system 36 via the communications network 32. The central processing system 36 receives the token image data at its communications server 38, and processes 86 the token image data received from the user device 34 at its controller 40. The processing results in a token type being determined 88, and this token type is then used to quickly extract the user-specific data from the token image data, and therefore from the token. Finally, the obtained token type and user-specific data are confirmed 90 at the user device 34 and a new database entry is created for the obtained information in the central processing system's database 42.

Each step of the method of FIG. 3 will now be considered in more detail. The first and second steps 82, 84 of the method, comprising obtaining 82 token image data via the user device 34 and communicating 84 token data to the central processing 36 system, are expanded upon in FIGS. 4 and 5.

Returning now to FIG. 4, the user device 34 that forms part of the system of FIG. 2 is shown in detail in the form of a schematic block diagram. The user device 34 comprises a controller 100 in communication with a camera 102, a data store 104, an interface 106, a display 108 and a communications module 110. The communications module 110 is operable to facilitate exchange of data with other processing elements shown in FIG. 2 via the communications network 32. The app 112 is stored within the data store 104, and is able to be run on command by the controller 100 in the conventional manner. The interface 106 of the user device 34 is integral with the display 108 and is a touch screen in this embodiment. Typically the user device 34 is a smart phone or tablet.

Figure 4:
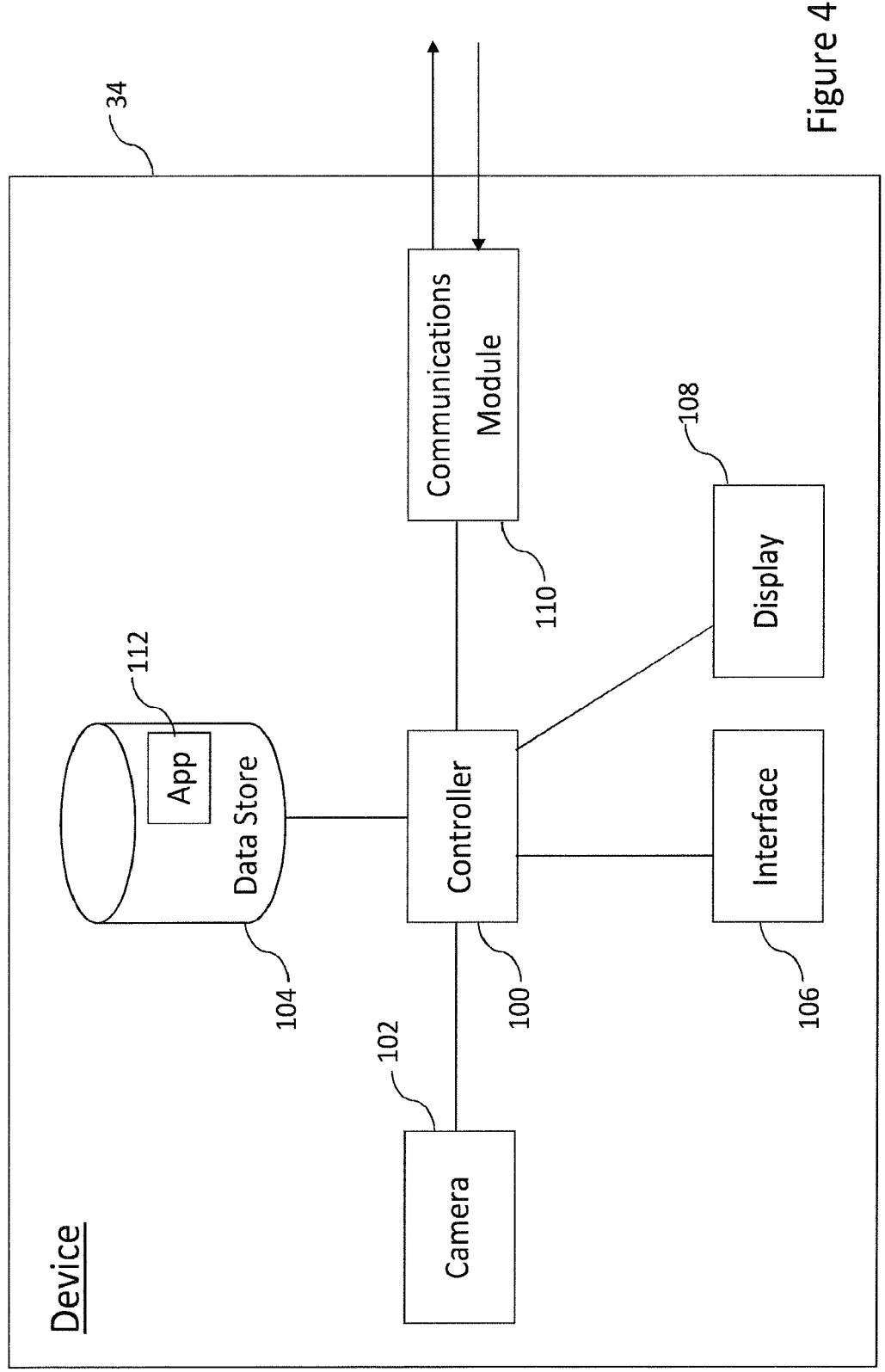
FIG. 4 is a schematic block diagram of the user device that may be used in the system of FIG. 2.
Figure 5:
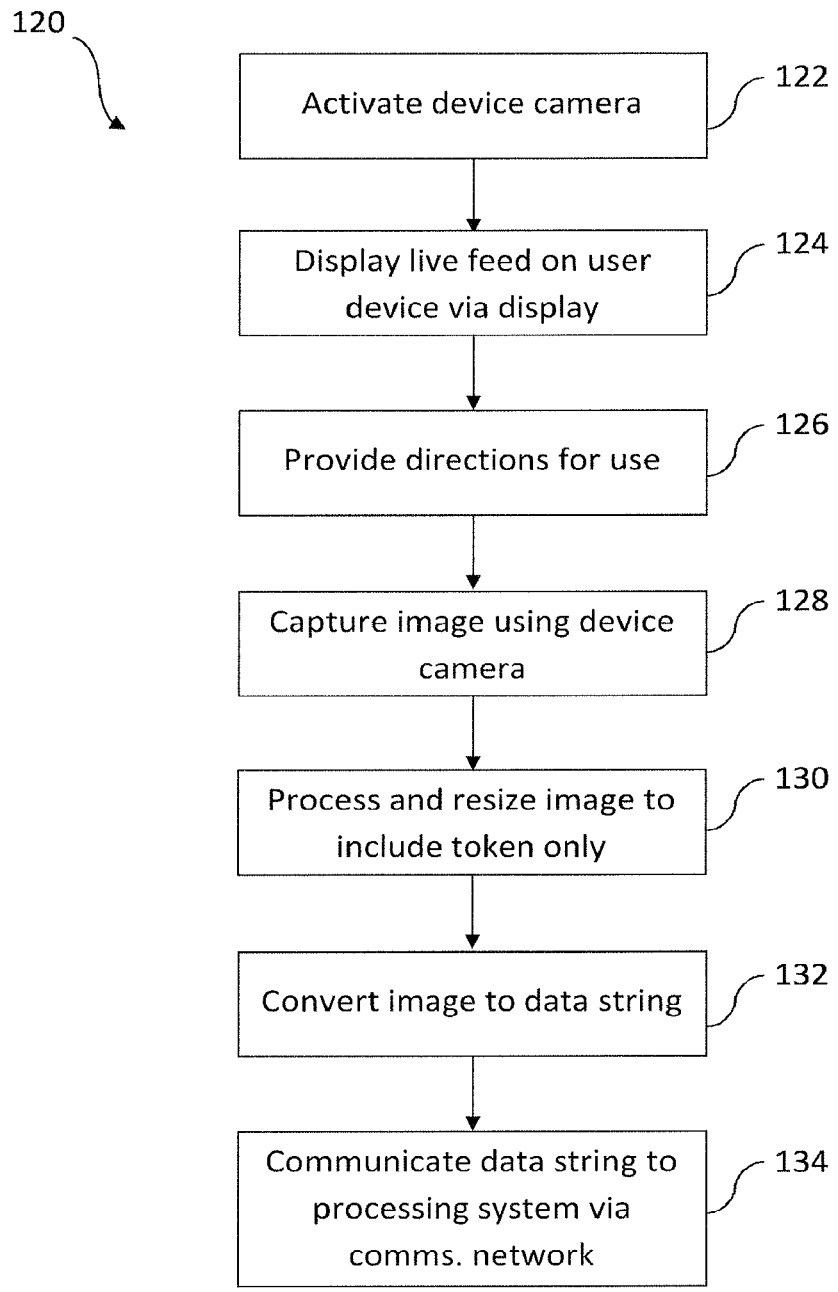
FIG. 5 is a flow chart showing in detail the step of obtaining an image of a token of FIG. 3 using the user device of FIG. 4.

FIG. 5 illustrates a method 120 of obtaining the token image data undertaken by the device controller 100. Considering both FIGS. 4 and 5, inputting token image data to the user device 34 comprises the controller 100 activating 122 the device camera 102 and displaying 124 a live video feed from the device camera 102 on the display 108 of the user device 34 by the controller 100. Displaying 124 the input from the camera 102 on the display 108 allows a user using the device 34 to position the user token 68 and camera 102 relative to one another to allow an image of the user token 68 suitable for processing to be captured 128.

To further aid a user in positioning the user token 68 and/or camera 102 correctly, directions for use are provided 126 to the user. For example, directions for use may be displayed on the display 108 in the form of written instructions to the user as to how to position the user token 68, or as images super-imposed onto the real-time images displayed from the camera 102. In some embodiments, this may take the form of corner indicators, which show the user where each corner of the user token 68 should be or it may be a box within which the user token 68 should be positioned, or may be an outline of an example user token 68. These positioning indicators reduce the risk of partial images being captured or misalignment of the orientation of the user token 68.

At the next step, the controller 100 captures 128 an image of the user token 68 from the device camera 102. The controller 100 captures 128 the image once a predetermined criteria is met, or once a predetermined time limit is exceeded. By setting a criteria and a time limit, it is guaranteed that an image will be obtained by the controller 100 even if criteria is not met. This provides a compromise between quality of image and of speed of recognition that is important in this implementation. It is possible that both or one of the user token 68 and user device 34 will be hand-held, and so there is likely to be some movement of the user token 68 and camera 102 relative to one another. It is therefore necessary to capture an image even if it is not of a particularly high quality. Furthermore, it is likely that the user token 68 will be identifiable even from a poor-quality image due to the later processing.

In some embodiments, multiple images are obtained over a short space of time and averaged out to reduce motion artefacts from the image. In other embodiments, multiple images may be obtained and processed individually, providing a higher potential success rate for user token 68 and information identification.

The image is captured as a medium- to high-resolution image. However, the minimum resolution that may be used to maintain accuracy in token recognition is 600×400 pixels. Similarly, bright lighting conditions are ideal for image capture but the system is robust enough to handle partial images in poor lighting conditions and still operate correctly.

Having obtained 128 an image, the controller 100 processes 130 the image and/or resizes it to reduce the amount of data that is required to be sent across the communications network 32. The automatic resizing (cropping) 130 is carried out to reduce the image to that of the user token 68 only, thereby removing any background information that would otherwise increase the processing required by the central processing system 36 to identify the token type. The resizing 130 may comprise edge detection, for example, or may comprise reducing the image to the size of the guidelines/directions provided to the user earlier on in the process. In either case, the resized image may be pre-processed or sampled to further reduce the amount of information contained within the image. For example, pre-processing may comprise the following image processing techniques: converting the image to a greyscale image; implementing a median blur on the image; eroding the image; dilating the image; edge detection within the image; and using a Hough line transform on the image. These techniques may also be used at any other pre-processing stages described in the current embodiments.

Following re-sizing and any further processing 130, the image is converted 132 to a data string by the controller, before being transmitted 134 by the communications module 110 to the central processing system 36 via the communications network 32. The data string is relatively small, being approximately 110k bits in size, although this may vary between devices depending upon the camera 102 implementation of the device 34. In this embodiment, the data string is a base64 encoding of the image. Regardless of the camera used, the size of the data string it is desired to keep the size of the data string relatively small, such that overall time for image recognition is as fast as possible whilst retaining the accuracy of correct user token type recognition. In this regard it is envisaged that the maximum size of the data string does not exceed 500k bits.

Returning to FIG. 3, both the first and second steps 82, 84 of the process 80 are covered by FIGS. 4 and 5 and the accompanying description. The next steps of processing 86 the token image data and obtaining 88 token type/user-specific data will now be considered with reference to FIGS. 6a to 6c and FIG. 7.

Figure 6B:
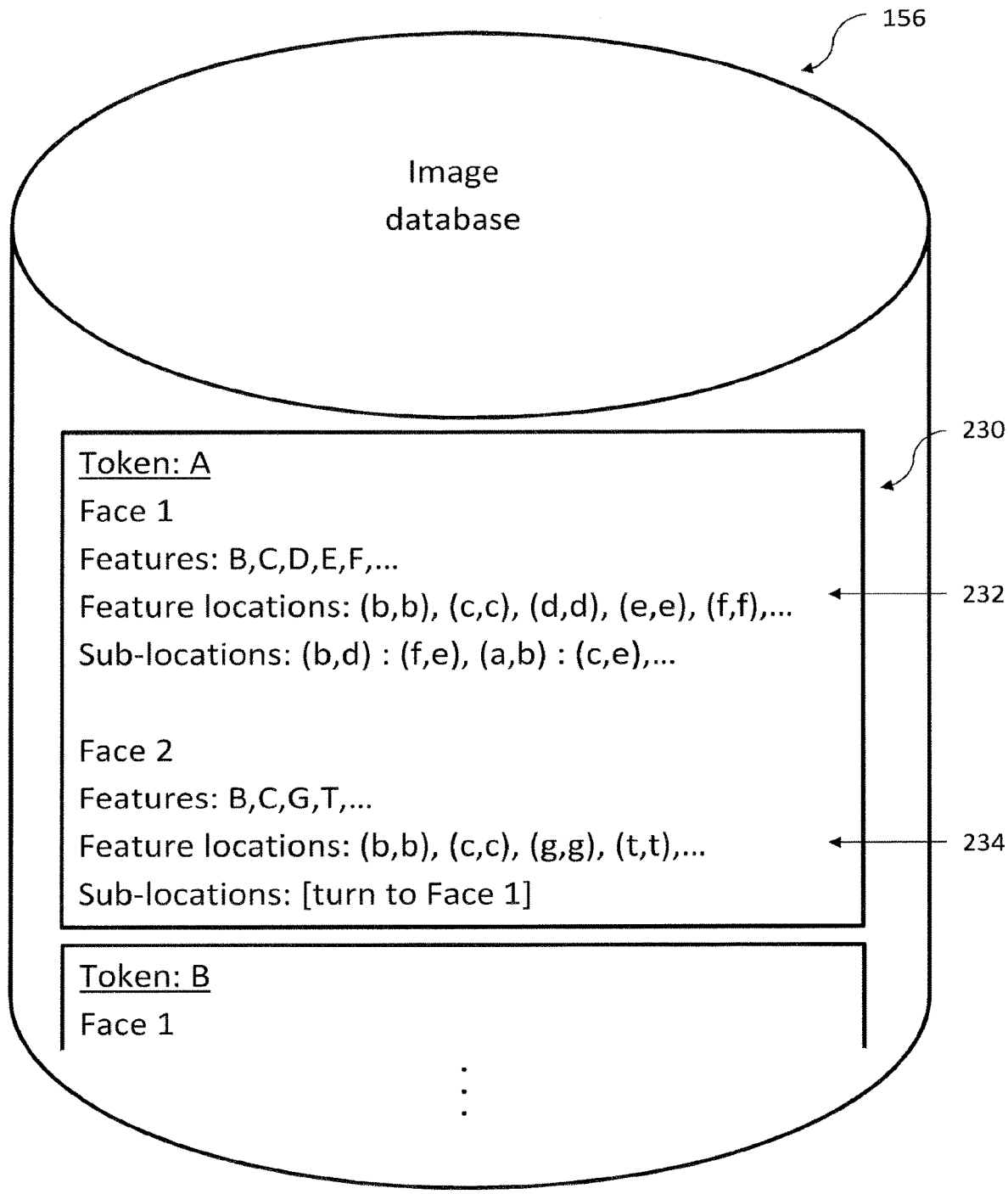

FIG. 6a illustrates the central processing system 36. As shown in FIG. 2, the central processing system 36 includes the communications server 38, the controller 40 and the database. The controller 40 further comprises a processor 149, a token recognition module 150 configured to detect discrete features within an obtained representation of a token image and match them to known features of known tokens, as well as an optical character recognition (OCR) module 152 for identifying characters within the token image and a barcode recognition module 154 for identifying and reading barcodes within the token image. It should also be noted that the database 42 of the central processing system 36 comprises two separate sections: an image database 156 and a user accounts database 158. The image database 156 contains information relating to known tokens of an uncommon format, while the user accounts database 158 contains specific information relating to each user, the user tokens registered using the application 112 and the payment cards registered with the user. The two database sections 156, 158 will be discussed in more detail in relation to FIGS. 6b and 6c, while the purpose of registering payment cards will be discussed as tokens having a common format in relation to FIGS. 14 to 16.

Figure 7:
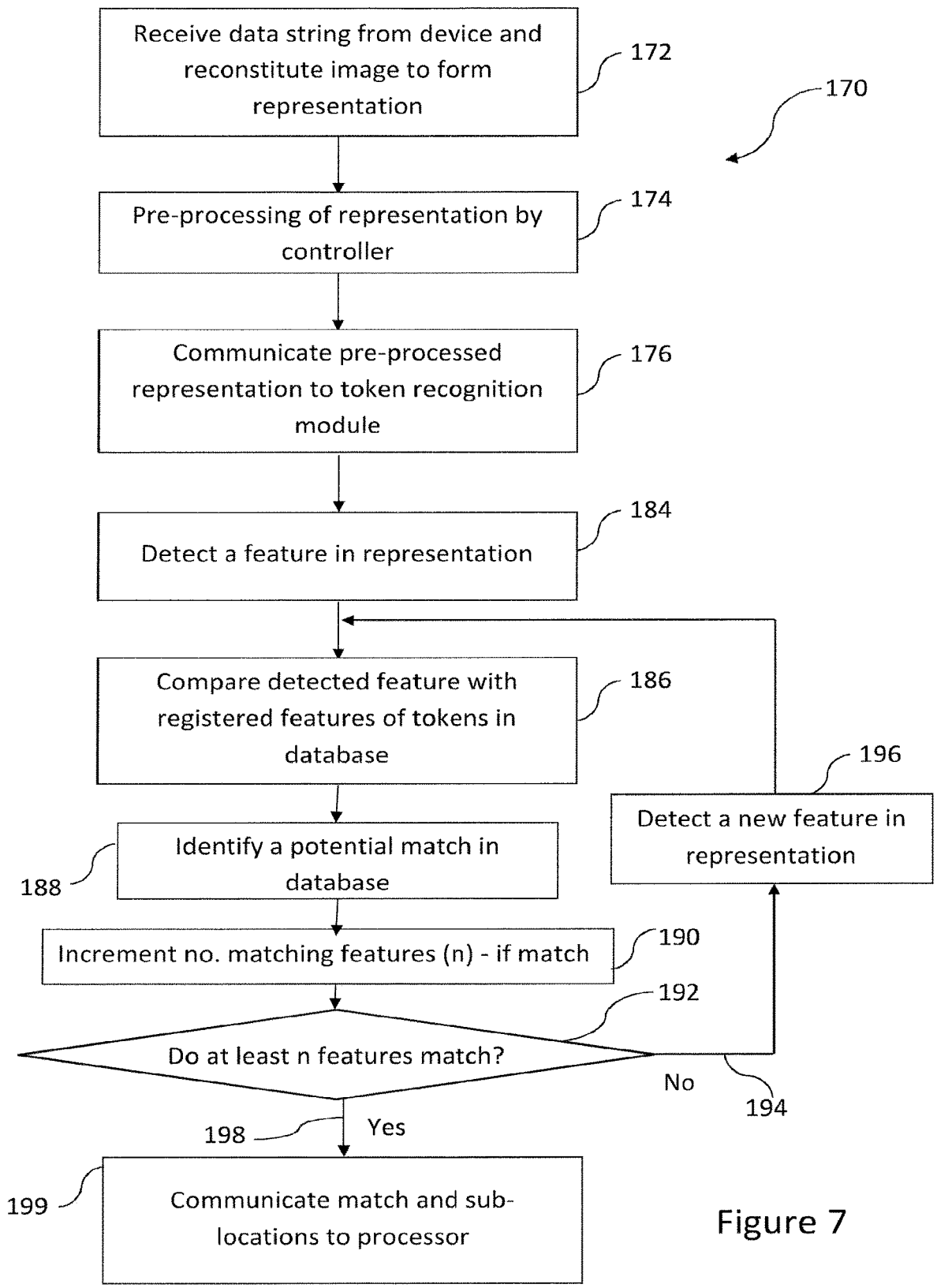
FIG. 7 is a flow chart showing in detail the step of obtaining type of token of FIG. 3.

The processing 88 of token image data, found at the third step of the method of FIG. 3, is expanded upon in the process 170 shown in FIG. 7. The data is communicated from the user device 34 to the central processing system 36 via the communications network 32 as a data string, and as shown in FIG. 7, is received 172 by the communications server 38 as a data string. The data string, having been communicated 172 to the controller 40 by the communications server 38 is reconstituted to form a representation of the image from the data string to allow pre-processing 174 of the representation. Reconstitution comprises decoding the data string in base64 and converting it to a standard matrix format to create an array. The conversion may in some embodiments be into an OpenCV Mat format using sStringIO.String IO. This can then be used to create a bumpy array to be used for pre-processing and feature detection at the central processing system.

Pre-processing 174 as described here comprises converting the representation into a grayscale image and/or blurring the representation using an adaptive Gaussian blur and/or an adaptive Gaussian threshold. These image processing techniques are not described further as they will be known to the skilled person. The use of an adaptive Gaussian blur and threshold introduces flexibility in the system to adapt to the input without slowing the process considerably. If a non-adaptive threshold were used, then the likelihood of the process failing to identify the type of token would be increased.

In some embodiments, pre-processing 174 comprises applying all three image processing techniques described above. That is to say that the reconstituted representation is converted into a grayscale image, blurred and thresholded. In doing so, a much less data-intensive representation is created which accentuates features and allows for feature matching to be streamlined effectively. This optimisation of the representation for feature recognition therefore results in very fast detection of features later in the process. In some embodiments, however, three separate representations are created, each having one of the three techniques applied to it. In doing so, different features can be identified if one of the representations does not contain enough unique features to enable token type identification.

Having pre-processed 174 the representation, the processor 149 communicates 176 the processed representation to the token recognition module 150, where identification of the token type is undertaken. The token recognition module 150 comprises a local cache 178, a feature detector 180 and a feature matcher 182. The processed representation or representations communicated to the token recognition module 150 may be stored in the local cache 178 for faster recall during processing.

At the next method step, the feature detector 180 of the token recognition module 150 is used to detect 184 features within the processed representation(s). The feature detector 180 uses analysis of the representation and image processing techniques to identify features of the representation that can, in combination, be used to identify the token type. Edge detection, corner detection, contrast analysis, shape analysis and curve detection may all be used by the detector to identify discrete or individual features.

The image database 156 is provided with a plurality of image features relating to known user tokens of a given type. Each particular type of user token 68 has associated with it a subset of all the possible features. These features have previously been derived from processing each different type of known user token. A maximum feature count is imposed to limit the possible processing time in determining a match. For example, in some embodiments the maximum feature count may be 1000. An array of the features versus the known type of user token is generated, and may comprise a sparse array to improve the efficiency of the system when matching items. In some embodiments, the feature detection may be performed using known software such as the ORB feature detector.

The feature detector 180 uses the entire representation to detect 184 features. The feature detector 180, having detected a feature, will also assign to that feature a location parameter within the representation. These location parameters may be defined according to a coordinate system or by another position defining technique and are obtained from the stored data relating to the known user tokens.

Figure 8:
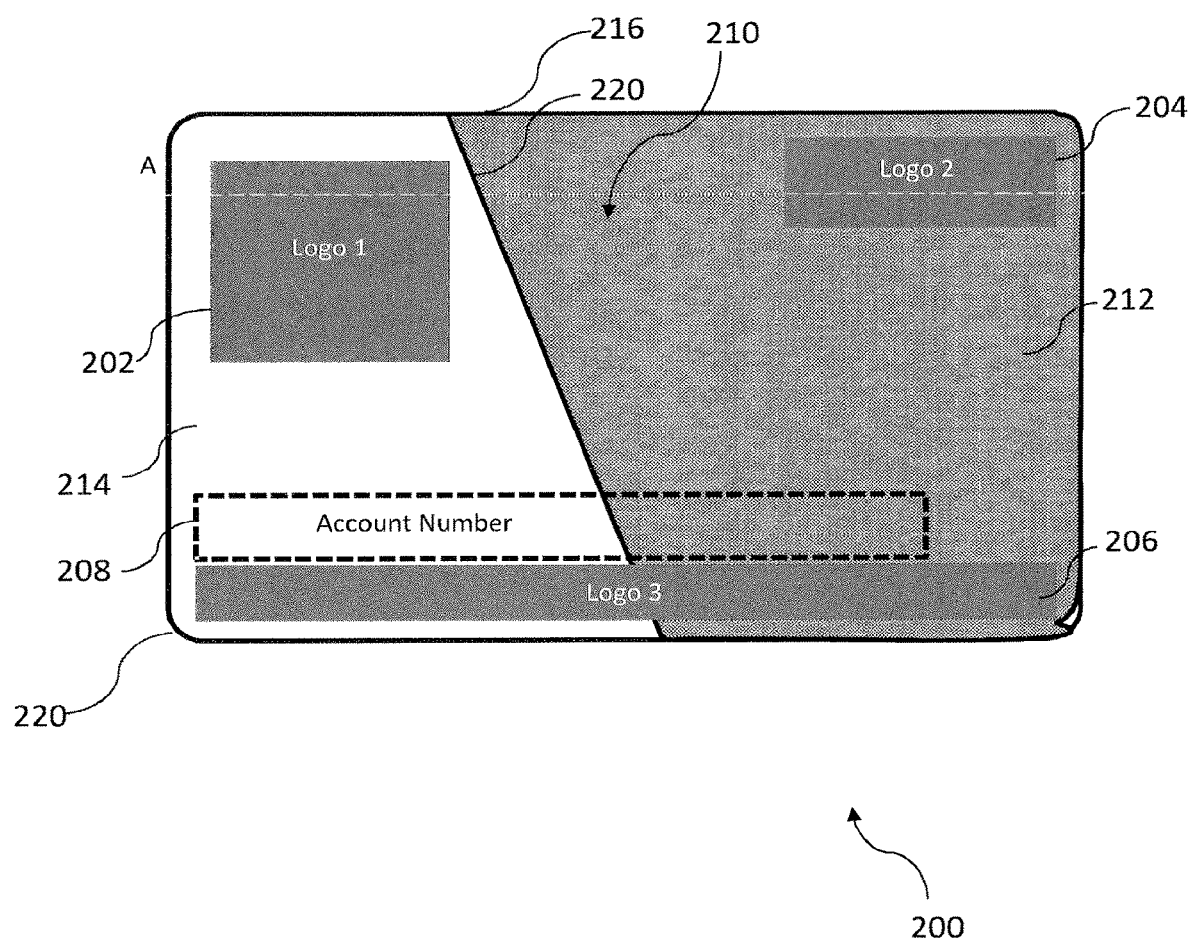
FIG. 8 is an example of one face of a typical user token having an uncommon format.

FIG. 8 shows an example representation 200 that may be obtained of a token. This is a representation for illustrative purposes only and tokens may include all, some, or none of the features discussed in relation to FIG. 8. Some tokens may include other identifiable features.

As can be seen in FIG. 8, the example token 200 incorporates three logo designs 202, 204, 206, an account number 208 and a background design 210 in which are two portions 212, 214 of contrasting colour. It will be assumed that the logo designs 202, 204, 206 have a third colour that differs from the first and second colours in each of the contrasting portions 212, 214.

For example, in the example token 200 of FIG. 8, along the line 'A', features may be identified such as the edge 216 of the token 200 (if the cropping was not totally successful), the contrast between the background 214 and logo 1 202, the contrast of the two background portions 212, 214, and so on. Other features, such as the rounded edges 218 of the token 200, the diagonal line 220 separating the two background portions 212, 214, the shape of the logos 202, 204, 206, may be detected and used to uniquely identify the type of token 200.

Returning to the process of FIG. 7 and the central processing system 36 of FIG. 6a, the token recognition module 150 stores a version of the representation including detected features in the local cache 178 and uses its feature matching portion 182 to compare 188 the detected features and their locations to the array of features provided in the image database 156.

In FIG. 6b, a schematic representation of the image database 156 is shown. Within the image database 156, a list of known tokens 230 is included. Each known token has two sets of data 232, 234, each set 232, 234 corresponding to a respective face of the token. Each set 232, 234 comprises a list of detected features, each face of the known token having been passed through the feature detector 180 previously to derive the subset of features associated with that face of the user token 68 and the location of the feature if relevant. Also stored in each set is the corresponding location of each feature. Further information relating to a sub-location of the token may also incorporated into each set.

To identify 188 a match for the unknown user token 68 the feature matcher 182 utilises a matching algorithm to match the features of the unknown user token 68 to known user token entries including their associated features in the image database 156 or library. The matching algorithm used may operate according to a nearest neighbour search optimization, or a 'Fast Library for Approximate Nearest Neighbours' matcher, both of which will be known to the skilled person. The advantage of such a system is gained because there is minimal reliance on the orientation and relative size of the features. This means that the user token 68 may be oriented differently or that the image may be captured at an angle to the token so that there is a perspective change, yet the features can still be recognised and matched. Even in the case that the user takes a partial image of the token enough features may still be present to achieve a minimum match count. This provides a notable advantage of the current system over known recognition systems such as Haar cascading classifiers that are much less efficient if the features being captured are not in the correct orientation.

Returning to FIG. 7, the process identifies 188 potential matches from the image database 156 using the matching algorithm by repeatedly taking an image from the representation, comparing it with the features in the image database 156, identifying a potential match and in this case incrementing 190 a counter (n) of matched features, determining 192 whether the counter has reached a predetermined minimum level and if not 194 repeating these steps for the next feature 196 in the representation. This process iteratively rules out tokens that are potential matches until only one possible match is left. This point 198 is usually reached when the minimum number of matched features has been reached. For example, a typical value for this minimum threshold is 30 features. Then the match (indicating type of token) and any additional information related to that type of token is communicated 199 to the processor 149. The additional information comprises sub-locations and any further information required for the identification of the token and in order to obtain user-specific identification information.

As can be seen in FIG. 6b, known token A has sub-locations on its 'Face 1' where user-specific data such as a barcode may be found. In contrast, 'Face 2' does not include and sub-locations but has the instruction that the user should turn to Face 1. If the unknown user token 68 is matched with Face 2 of Token A, the instruction to turn to Face 1, the sub-locations of Face 1, and the token type, Token A, would be communicated 199 to the processor 149 at the final step of the method of FIG. 7.

It is to be appreciated that the sub-location information also denotes whether the sub-location relates to a barcode or to characters.

While it is assumed here that the known user token will include only relevant information, and therefore a sub-location, on a single face of the user token, it will be appreciated that a user token may include relevant information on both faces. In such a case, the user token may include a barcode on one face, and an identifier number corresponding to the barcode on the other face. In this case, the system may attempt to obtain information from the face presented to it or may still issue the instruction to turn to the other face. This choice would be made to provide a compromise between the likely accuracy of obtaining the information and the speed with which it can be achieved. In the present embodiment, the system favours reading a barcode over character recognition (OCR) as the size of characters on a token is likely to be small and may reduce the accuracy of the OCR recognition as compare to barcode recognition.

As mentioned earlier, if no feature of the representation is matched 194 during the feature matching stage 192 of FIG. 7, the feature detector 180 obtains a new feature 196 and returns to the previous step 186 comparing that feature with features of the image database 156 to find another potential match. In some rare embodiments, the system may ask the user to provide another image of the user token 68 or to manually select the user token type from a list of predetermined types.

Figure 9:
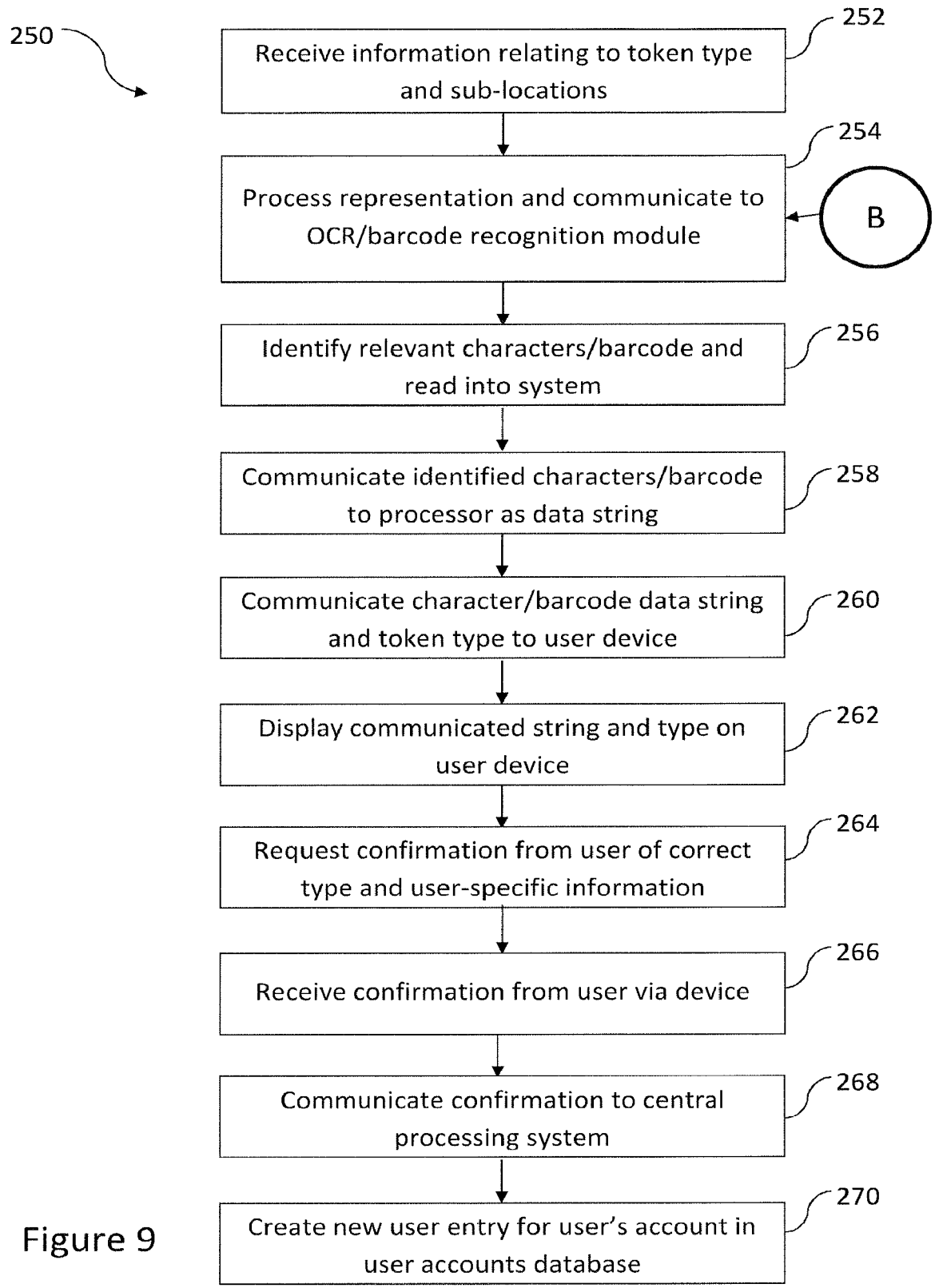
FIG. 9 is a flow chart showing in detail the step of obtaining user-specific data of FIG. 3 from the front face of the token.
Figure 10:
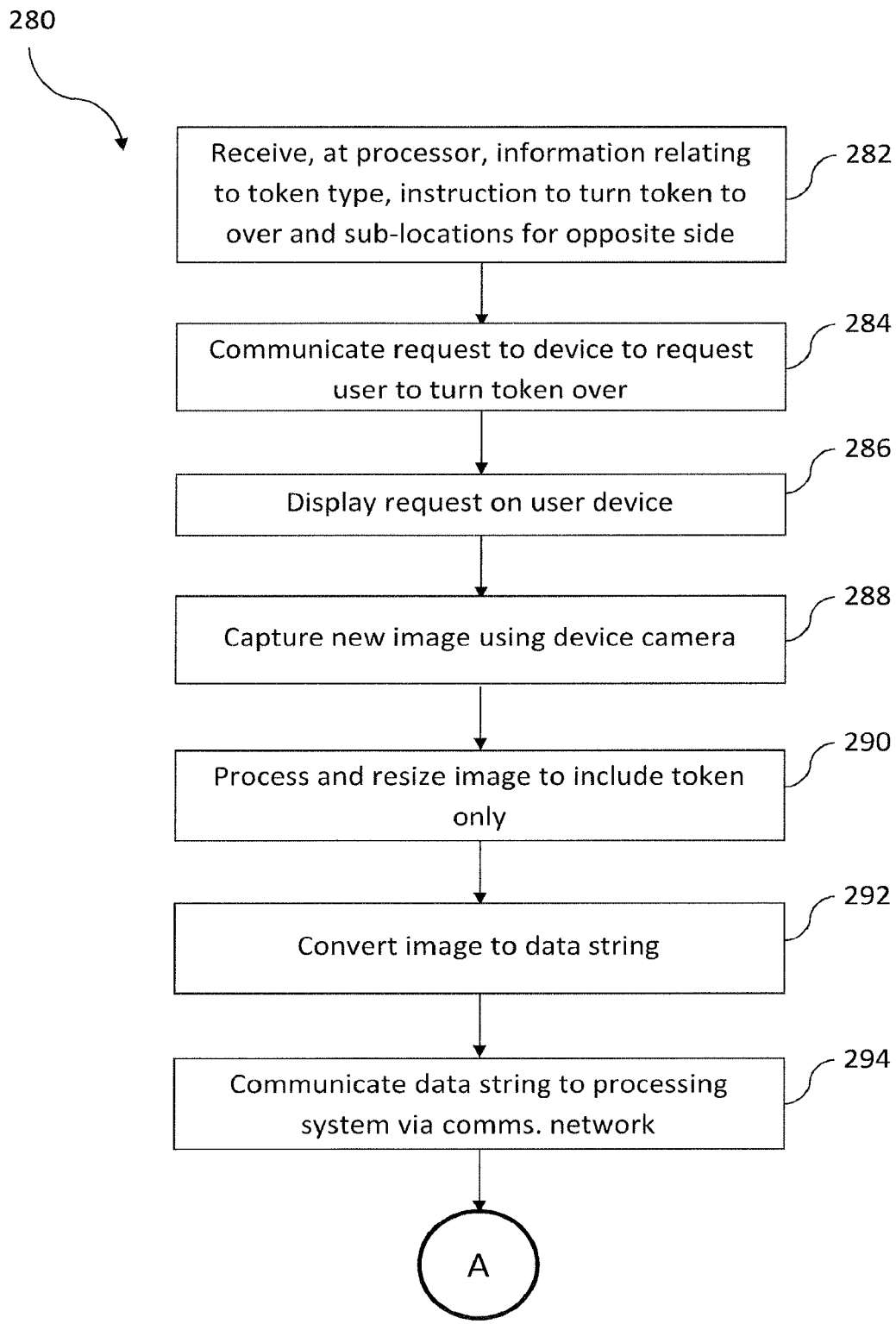
FIG. 10 is a flow chart showing in detail the step of obtaining user-specific data of FIG. 3 from the reverse face of the token.
Figure 11:
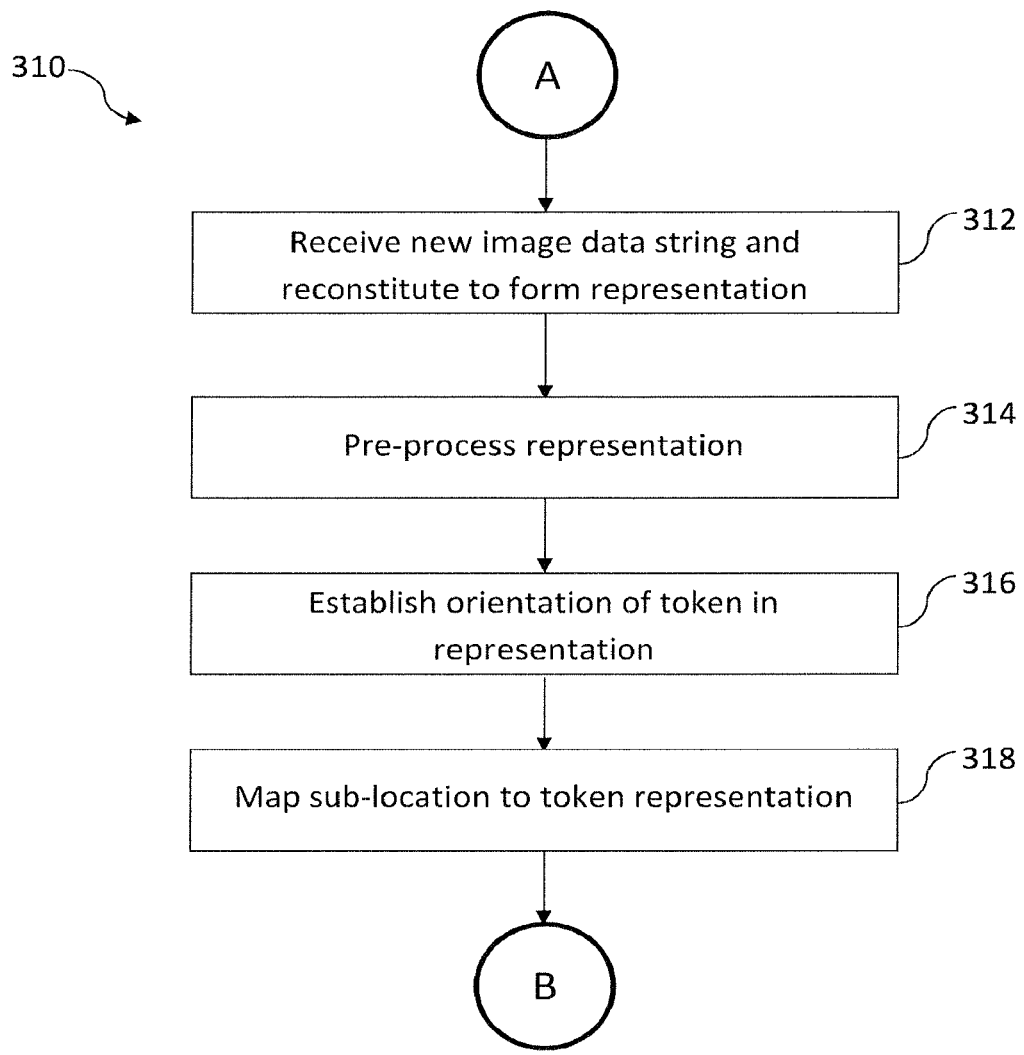
FIG. 11 is a flow chart showing a method of identifying the type of token.

Once the token type and sub-location information have been communicated 199 to the processor 149 by the token recognition module 150, the processor 149 implements either the method shown in FIG. 9 or the methods of FIGS. 9, 10 and 11.

If the representation of the unknown token is identified to contain relevant information at a sub location, i.e. the user token 68 was presented on the face including a barcode or relevant character information, then the processor 149 implements the method 250 of FIG. 9 to obtain and confirm the user-specific data. This method 250 follows on from the method of FIG. 7.

In the method 250 of FIG. 9, the processor 149 receives 252 the user token type and sub-locations from the token recognition module 150. The processor 149 may receive additional data from the token recognition module 150, outlining the orientation of the user token 68 in the representation or image. This allows the processor 149 to map the sub-locations to the representation of the user token 68. This mapping allows the processor 149 to process 254 the original representation or the previously processed representation to include only the information contained within the coordinates of each sub-location. The representation may then be further processed by the controller 40 to enhance the characters or barcode for improved recognition. This step may be carried out by the OCR module 152 or barcode recognition module 154 of the controller 40.

The processor 149 communicates 254 the newly cropped and processed representation to either the barcode recognition module 154 or the OCR module 152. If the controller 40 did not receive an indication as to whether the user-specific data is contained as a barcode or as characters, it may communicate the representation to both modules, waiting for the fastest positive recognition from either before communicating to the other to cease the recognition process.

Either of the OCR module 152 or the barcode recognition module 154 identifies 256 the relevant information in a conventional manner, and communicates 258 this back to the processor 149 as a data string. This data string is combined with the user token type and communicated by the controller 40 to the communications server 38 for transmission back to the user device 34.

In some embodiments, the reconstituted representation is initially communicated to the barcode recognition module 154 for barcode recognition. If no barcode is found within a short time limit, the representation is passed to the token recognition module 150 after which the processor 149 only passes sub-location information to the OCR module 152. In some alternative embodiments, the processor 149 may distribute the reconstituted representation to all three recognition modules 150, 152, 154 to identify all pertinent information simultaneously.

At the user device 34, the string and token type are received by the communications module 110 and communicated to the controller 100 of the user device 34, where according to the app, the user device controller 100 displays 262 the string and the token type on the display 108. The user device controller 100 also requests confirmation 264 from the user that the token type and the user-specific data are correct.

The user provides 266 confirmation to the controller 100 via the interface 106, and the user device controller 100 then communicates 268 the confirmation back to the central processing system 36.

Figure 6C:
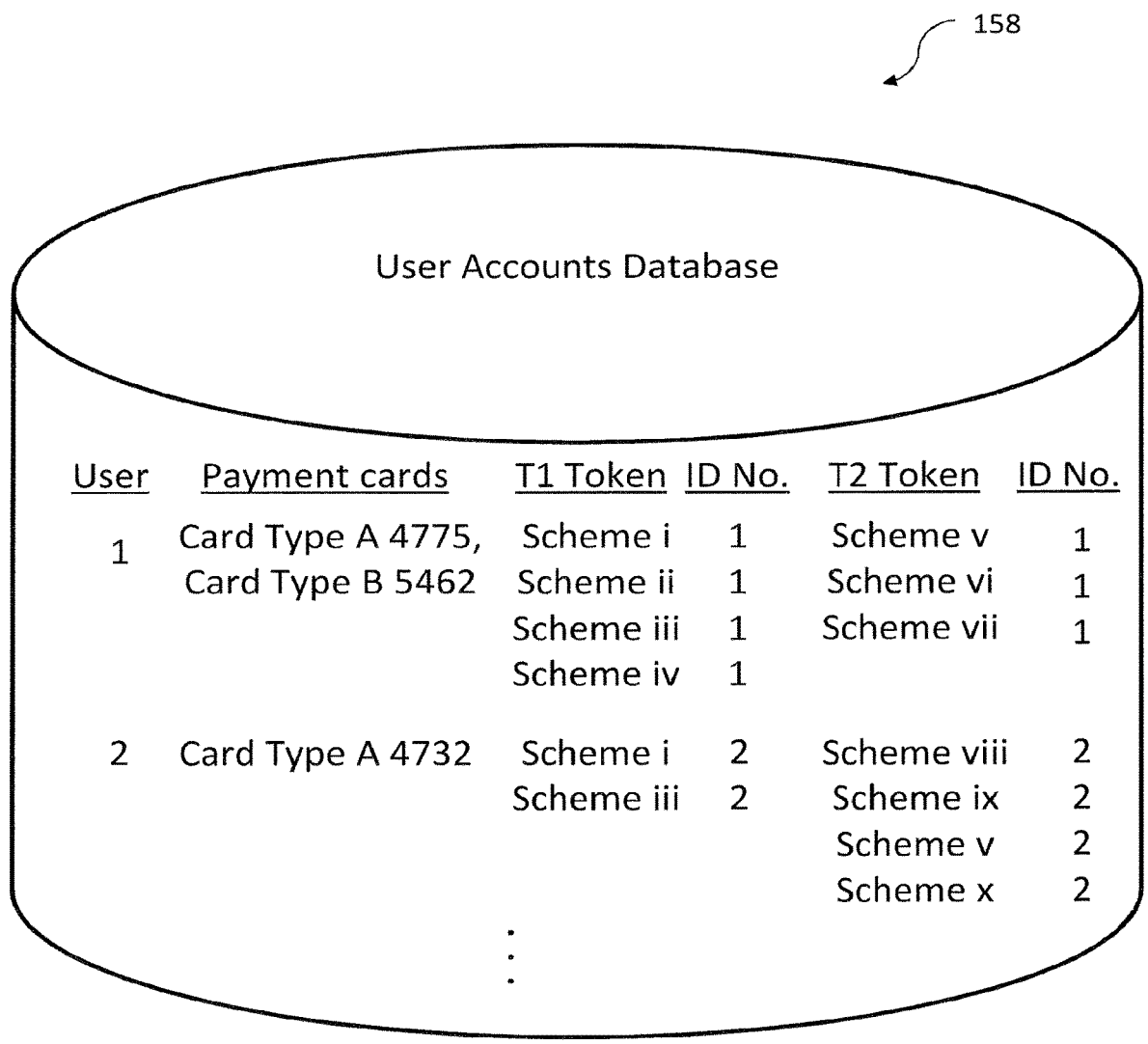

Upon receiving the confirmation, the processor 149 creates 270 an entry within the user accounts database 158, as shown in FIG. 6c, that that user has the identified token, and that the identified token has associated user-specific data in the form of a unique identifier, for example, an ID number. The separation of user tokens into T1 and T2 tokens as shown in FIG. 6c will be discussed in more detail later.

If the representation of the unknown user token 68 does not contain user-specific data at a sub location, i.e. the token was presented on the face that did not include a barcode or relevant character information, that relevant barcode or character information is present on the other face. Accordingly the entry in the image database 156 had an associated instruction to turn the user token 68 over to the opposite face and the method 280 of FIG. 10 is implemented to obtain and confirm the user-specific data. This method 280 follows on from the method of FIG. 7.

In the method 280 of FIG. 10, the processor 149 receives 282 information from the token recognition module 150. The information includes the user token type, the instruction to request that the user token 68 be turned over to show the opposite face in order to obtain the user-specific data, and the sub-locations of where, on the opposite face of the user token 68, the user-specific data can be found.

The processor 149 then transmits 284 to the device 34 a request that the token be turned over. The request is received by the device 34 which displays 286 the request to the user. Once the token has been turned over, a new image is captured 288 by the user device 34 of the newly shown face of the user token 68 in a similar manner to that described above in relation to FIG. 5.

The image, as in the method of FIG. 5, is then resized and pre-processed 290 to reduce the amount of data that must be communicated to the central processing system 36 across the communications network 32, and is subsequently converted 292 to a data string and communicated 294 to the central processing system 36.

The new image is received by the controller 40 of the central processing system 36 and an adapted token recognition process is implemented according to the method 310 of FIG. 11.

The adapted token recognition process 310 of FIG. 11 is as follows. Having received 312 the new image data string, the processor 149 of the controller reconstitutes the image to form a representation of the user token 68 as before and subsequently pre-processes 314 it. This pre-processing 314 may be similar to the previous pre-processing, to allow for improved and more efficient feature detection. Alternatively, this may be an altered pre-processing step, whereby only certain processing techniques are used so that certain features can be established, allowing for efficient identification of token orientation.

Following the pre-processing 314 of the new user token representation, the processor 149 communicates the pre-processed representation to the token recognition module 150 which matches newly detected features to establish 316 the orientation of the user token 68 only. This may be done by comparison with a set of designated features that clearly allow for the establishment of the orientation of the user token 68. These features may be designated within the image database 156.

Once the orientation of the user token 68 has been established 316, the controller can map 318 the sub-locations previously identified from the first feature detecting/matching process 280 to the new representation of the opposite face of the token.

Following this step 318, the system follows the method 250 of FIG. 9, beginning at the image processing 254 to crop to the user-specific data only, designated here by an encircled 'B'.

In alternative embodiments, the sub-location information may be transmitted to the device 34, and the optical character and/or barcode recognition may be carried out by the device 34.

Figure 12:
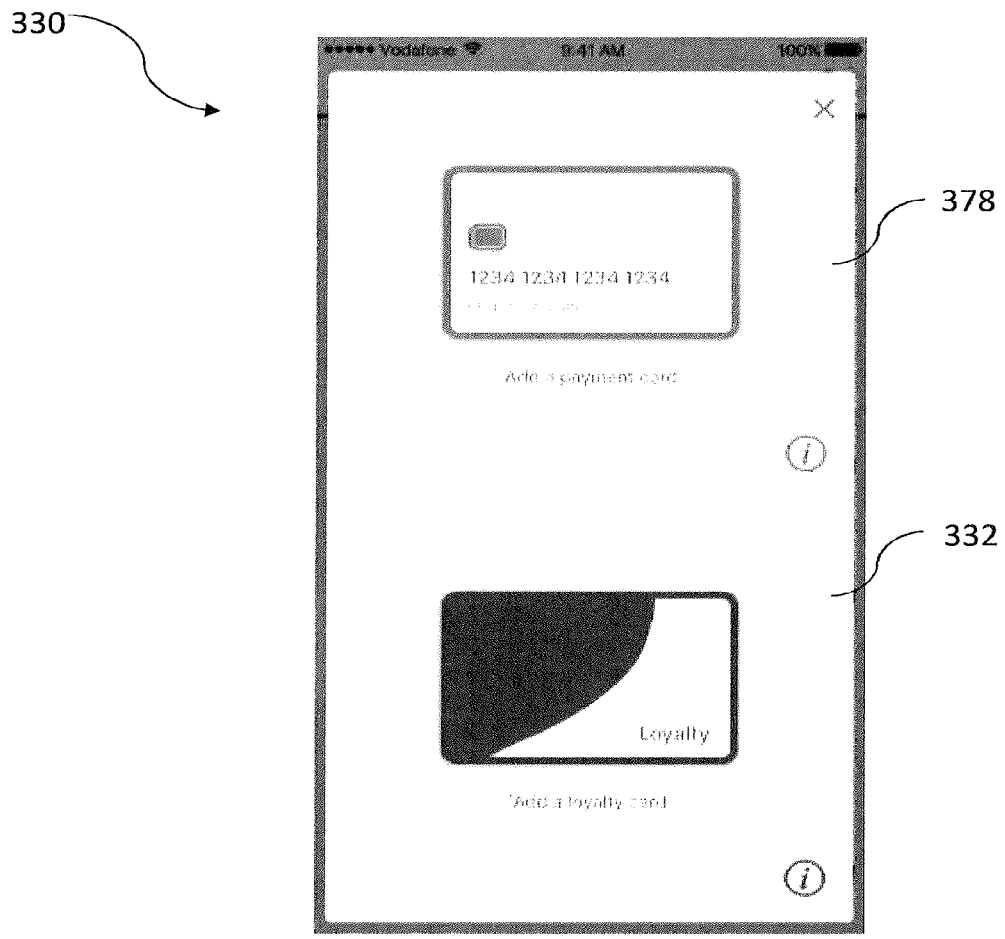
FIG. 12 is a screenshot showing a screen displayed on the user device of FIG. 2 to allow a user to choose to identify a payment card or a token.

The methodology for recognising and identifying a token type and its user-specific data requires the user to choose to activate the token-recognition processes. When using the application 112, the display 108 of the user device 34 presents to the user a choice to activate token recognition of tokens having an uncommon format or token recognition process where tokens have a common format, for example as with payment cards, and an example screen 330 displaying this choice is shown in FIG. 12. In this particular embodiment, using the device interface 106, the user selects the 'add loyalty card' option 332, and the device controller 100 begins the method 80 of FIG. 3.

According to an alternative embodiment of the invention, however, both common format token recognition and uncommon format token recognition may be carried out using the same process, without the requirement for the user to differentiate between the different types of token.

Figure 13:
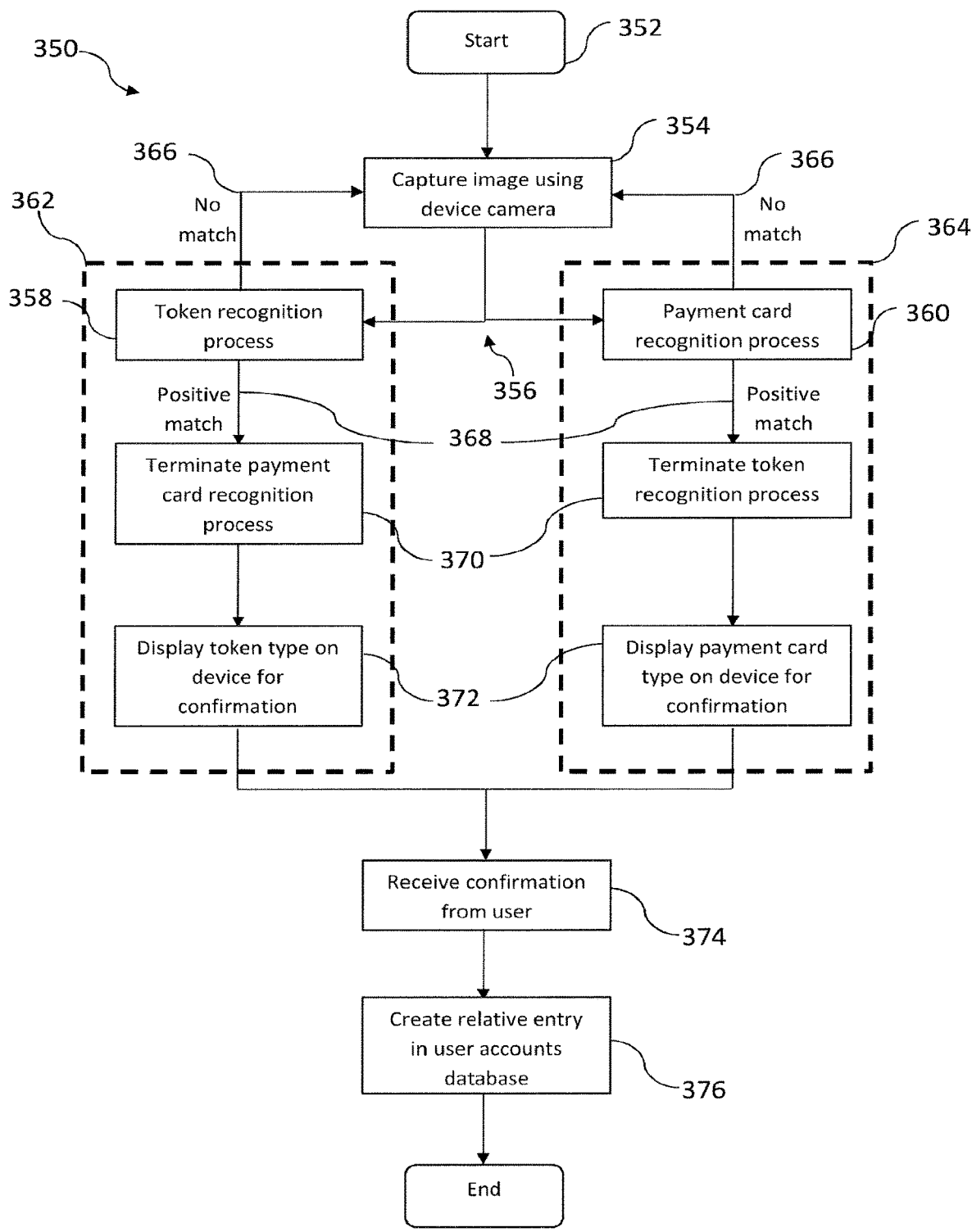
FIG. 13 is a flow chart showing a method of using a single processing stream to differentiate between and identify payment cards and tokens.

FIG. 13 shows a method for implementing this 'dual-pipeline' process 350 according to an embodiment. The process 350 convenes 352 with an option being activated by the user in the application 112 using the device interface 106, to command the user device 34 to initiate the dual-pipeline process 350 of FIG. 13. The user is then prompted to scan a token. The user does not have to specify whether the token has a common or uncommon format, for example, whether the token is a loyalty card or a payment card. A single frame or image is automatically captured 354 from the live feed of the device camera 102 and the process progresses to the next step. The capturing 354 of this image is similar to the capturing of image in relation to the method 120 of FIG. 5.

The process 350 then splits 356 into parallel processing streams with the device controller 100 implementing two matching processes simultaneously. Both these processes are carried out on the user device 34 and the token recognition process may or may not be similar or the same as the process described earlier. In some embodiments the token recognition process of FIG. 13 is wholly carried out by the user device 34 without the need to communicate any information over the communications network 32 to the central processing system 36. In other embodiments, the system set up is for reference images and derived features/descriptors to be maintained at the central processing system and for the mobile telecommunications device to transmit a base64 encoded image to the central processing system and receive a response expressed in a JSON (JavaScript Object Notation) format.

In one of the processing streams, i.e. the left-hand 'pipeline' 362 as shown in FIG. 13, a token recognition process 358 takes place to try to identify a user token 68 relating to an uncommon format, for example, a loyalty or reward scheme run by a retailer or retailers. In the other stream, i.e. the right-hand 'pipeline' 364 of FIG. 13, a common format token recognition process such as a payment card recognition process 360 takes place. Both these processes 358, 360 take place simultaneously.

If the two processes 358, 360 are wholly carried out on the user device 34, then the token recognition process 358 implements a feature detection and feature matching system using the device controller 100. The feature matching system therefore compares the detected features against a library of features obtained from reference images which are stored locally on the device 34 within the data store. The library of reference images and of features derived from reference images is maintained by the central processing system 36, from which the device 34 downloads and/or updates the library when a connection to the communications network 32 is present. This is only the case where the processes are carried out wholly at the user device 34.

The payment card recognition process 360 may use known software to identify a common format user token such as a payment card or may operate using a feature detector 180 similar to that described above.

If, after a particular time period has elapsed, no match is found 366, the process 350 returns to the image capturing step 354, and captures 354 another image using the device camera 102 and the process begins again. After a predetermined number of attempts to capture 354 new images, the user may be notified that no match can be found, and prompted or given directions as to what can be done to improve the likelihood of a match. Whilst the system is configured to prevent this from occurring regularly, the possibility exists and so the need for this is evident.

If either pipeline yields a positive result 368, the device controller 100 immediately terminates 370 the other pipeline's recognition process as a card or token being identified is likely to be only one or other of an uncommon format token, or a common format token or payment card. Advantageously, this process 350 prevents unnecessary processing of a needless thread, saving processing power and energy, but more importantly arriving at a token recognition quickly and automatically without knowledge of the type of format of the token (common or uncommon).

The information gathered from the successful recognition process 358, 360 is then presented 372 to the user via the device display 108, before requesting confirmation of the data obtained from either the uncommon format token or the common format token or payment card. At this stage, if the process 350 is carried out wholly at the device 34, a connection to the communications network 32 is now required to register the token or payment card with the central processing system 36 and to receive confirmation 374 and create 376 a new entry in the user accounts database 158. If a connection is available and a payment card has been identified, the information is encrypted before transference of details to the central processing system 36.

When considering common format payment cards, it will be seen in FIG. 6c that the user accounts database 158 also includes entries for payment cards specific to each user. These are payment cards that have been registered by the user using the consumer application on the device 34 using either the dual-pipeline process 350 above or the choice screen 330 presented in FIG. 12 where the user chooses to optionally begin a common format payment card recognition process 378 or an uncommon format token recognition process 332 by their selection. The payment cards can be used to match transactions made to a loyalty card or reward scheme using that payment card at a qualifying POS terminal 48 with a particular token owned by that user. This has the advantage of allowing rewards to be awarded to the user even when they do not present the relevant loyalty token at the POS terminal 48 as is normally required.

Figure 14:
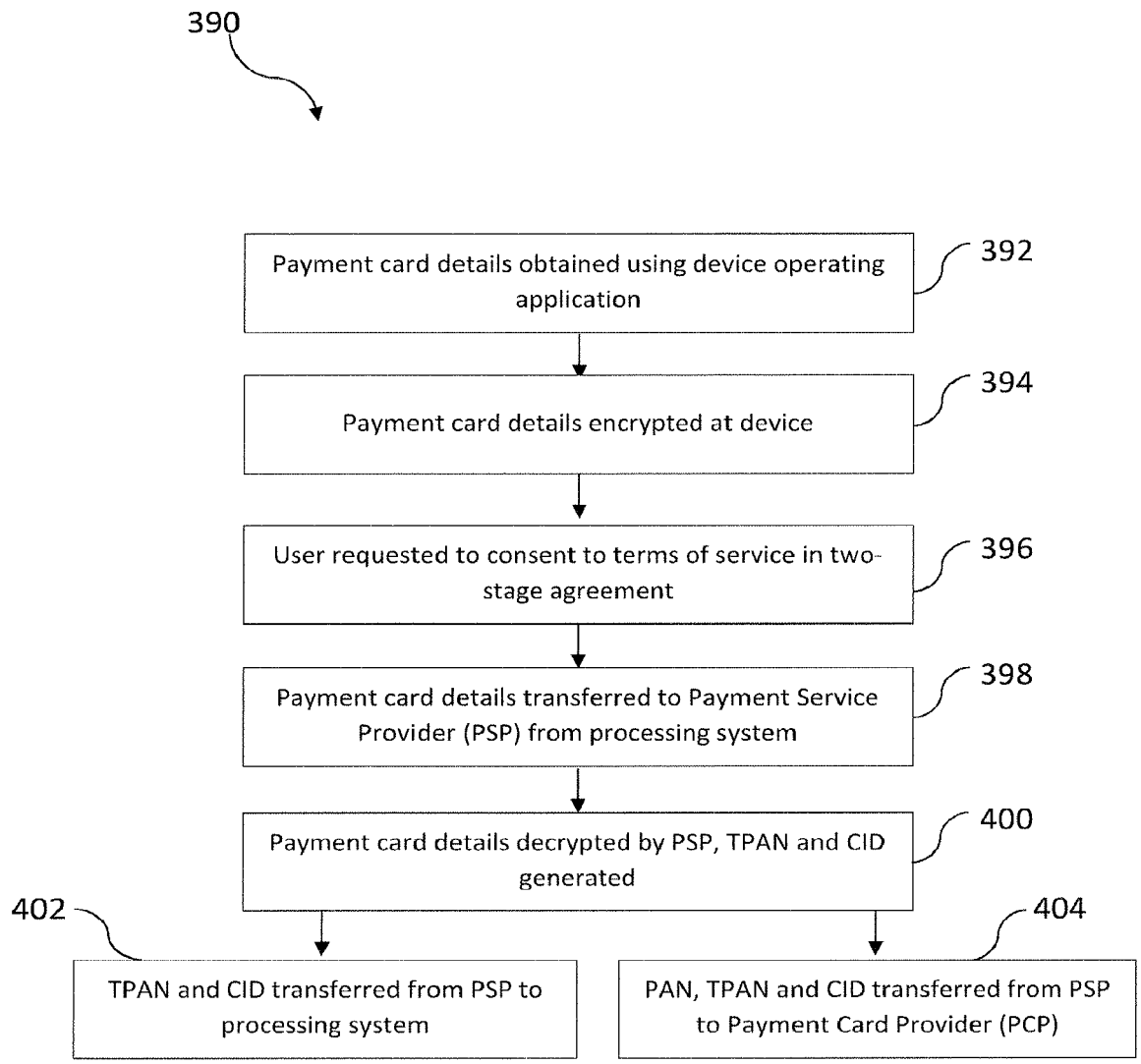
FIG. 14 is a flow chart showing a method of registration of a payment card using the system of FIG. 2.

Once a common format payment card and the relevant details on it have been identified, the method 390 shown in FIG. 14 is implemented by the system 30 of FIG. 2. In this method 390, the payment card details such as the PAN and the expiration date are obtained 392 initially, and quickly encrypted 394 at the user device 34. Following this, to register that payment card with the system 30, the user is required 396 to consent to the terms of service of the system in a two-stage agreement. Upon receipt of this agreement, and when an internet connection is present, the encrypted card information is securely transferred 398 from the device 34 to a Payment Service Provider (PSP) 46 via the communications network 32. This transference to the PSP 46 may also be via the central processing system 36, although the central processing system 36 is not be able to decrypt the encrypted card information, as this information may only be decrypted by the PSP 46.

The PSP 46 decrypts 400 the PAN from which it generates a payment token, or card identifier (CID) hereinafter to avoid confusion, and a truncated primary account number (TPAN). The CID is a non-sensitive data equivalent used to refer to the card so that reference can be made to it without any sensitive information being transferred via non-encrypted communications. The PSP 46 encrypts and securely transfers 402 the TPAN and CID back to the central processing system 36. The PSP 46 also encrypts and securely transfers 404 the TPAN and CID to the relevant Payment Card Provider (PCP) 44, i.e. the provider of the card that the user wishes to register to allow the PCP 44 to provide transaction data to the central processing system 36. This will be discussed in more detail later in relation to FIG. 16.

This makes the central processing system 36 and PSP 46 Payment Card Industry Data Security Standard Level 1 compliant, thereby classifying the central processing system 36 as a Service Provider. A Service Provider may access payment transactions made on registered payment cards. In this case, the purpose is to access transactions made to loyalty scheme or reward scheme providers. The central processing system 36 may therefore only access this information as a PCI DSS Level 1 compliant Service Provider.

When a user token 68 is identified by the process 350 of FIG. 13 or is registered using the process 80 of FIG. 3, the user token type is identified, and this categorises the user token 68 into at least one of two categories. These categories are formed according to agreements made between the token provider, or loyalty programme provider, and the processing system provider. If the programme provider and system provider have agreed on a partnership, the user token is classed as a Tier 1 (T1) token and the programme provider is known as a partner. If no partnership has been agreed, the user token is classified as a Tier 2 (T2) token.

The agreement between providers allows for the central processing system 36 to match transactions made using a registered payment card and assign the user rewards based upon their transactions that were not collected at the POS terminal.

Figure 15:
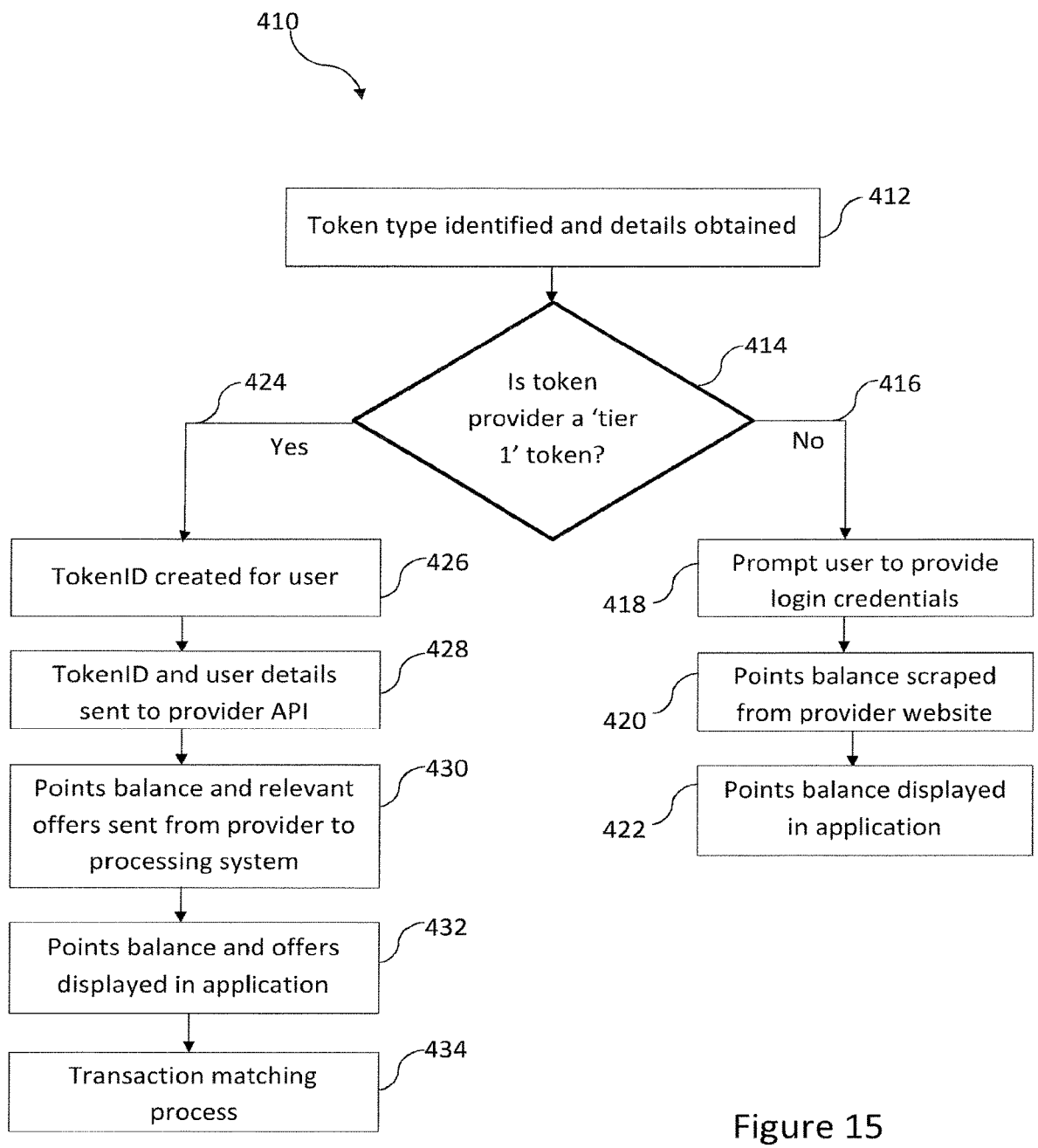
FIG. 15 is a flow chart showing a method of registration of a loyalty token using the system of FIG. 2.

The registration process for each kind of user token once the token type has been identified is shown in FIG. 15. In this process 410, following identification 412 of the token type and obtaining the relevant, user-specific data from the payment card, it is established 414 whether the user token is a T1 token or whether it is a T2 token. In both cases, the tier is recorded in the user accounts database 158 as shown in FIG. 6c, along with the user details associated with the user token.

Upon identification 416 of a T2 token, the user is prompted 418 to enter login details for the online account of that particular token or programme. With the user's permission, the central processing system 36 is then allowed to use internally developed data mining techniques to obtain 420 user information from the T2 token's corresponding programme website, such as points balance, points history, and the offers available to the user. This information will regularly be updated in both the central processing system 36 and displayed 422 in the consumer application.

Referring to FIG. 2, if the user token is a T1 token 424 and the programme provider is a partner, the central processing system 36 can interact directly with a partner system, for example System A 50, through a partner-management interface. The partner system comprises an editable partner database 62. Although not shown in FIG. 2, the partner-management interface comprises a management API, a partner API, and an SSH File Transfer Protocol (SFTP). The management API allows the partner system to transfer data to or consume data from the central processing system 36. The partner API allows the central processing system 36 to transfer data to or consume data from the partner system. The SFTP can be used as a substitute system for the above APIs, or in conjunction with one or both of the above APIs, depending on the preferences of either the partner or the central processing system 36. The direct communication between the central processing system 36 and the partner system may be via the general communications network 32 such as the internet or via a different, private communications network 32.

If a T1 token is identified, a TokenID is generated 426 that corresponds to the user-specific data obtained from the token, such as a membership number. The TokenID and the corresponding membership number of the token are communicated 428 to the partner system. In response, the partner system returns 430 a points balance, points history, and the offers available to the user, which are displayed 432 in the application 112. Upon identification of a T1 token, a transaction matching process 434 then begins, an example of which is given in FIG. 16.

In contrast, a system corresponding to a T2 token, such as Systems B and C 52, 54 in FIG. 2, only allow access by the central processing system 36 to the points information by using user credentials to 'log in' to the user's account via the communications network 32.

In most cases, by comparison with a conversion table for each programme, the user's points balance can be calculated according to their minimum monetary value. The conversion of points may take place at the consumer application, at a separate API, or elsewhere, for example.

The data received from the partner system or T2 token system, along with the minimum monetary value of the points is displayed in the consumer application in a tabular form or electronic 'wallet'.

Figure 16:
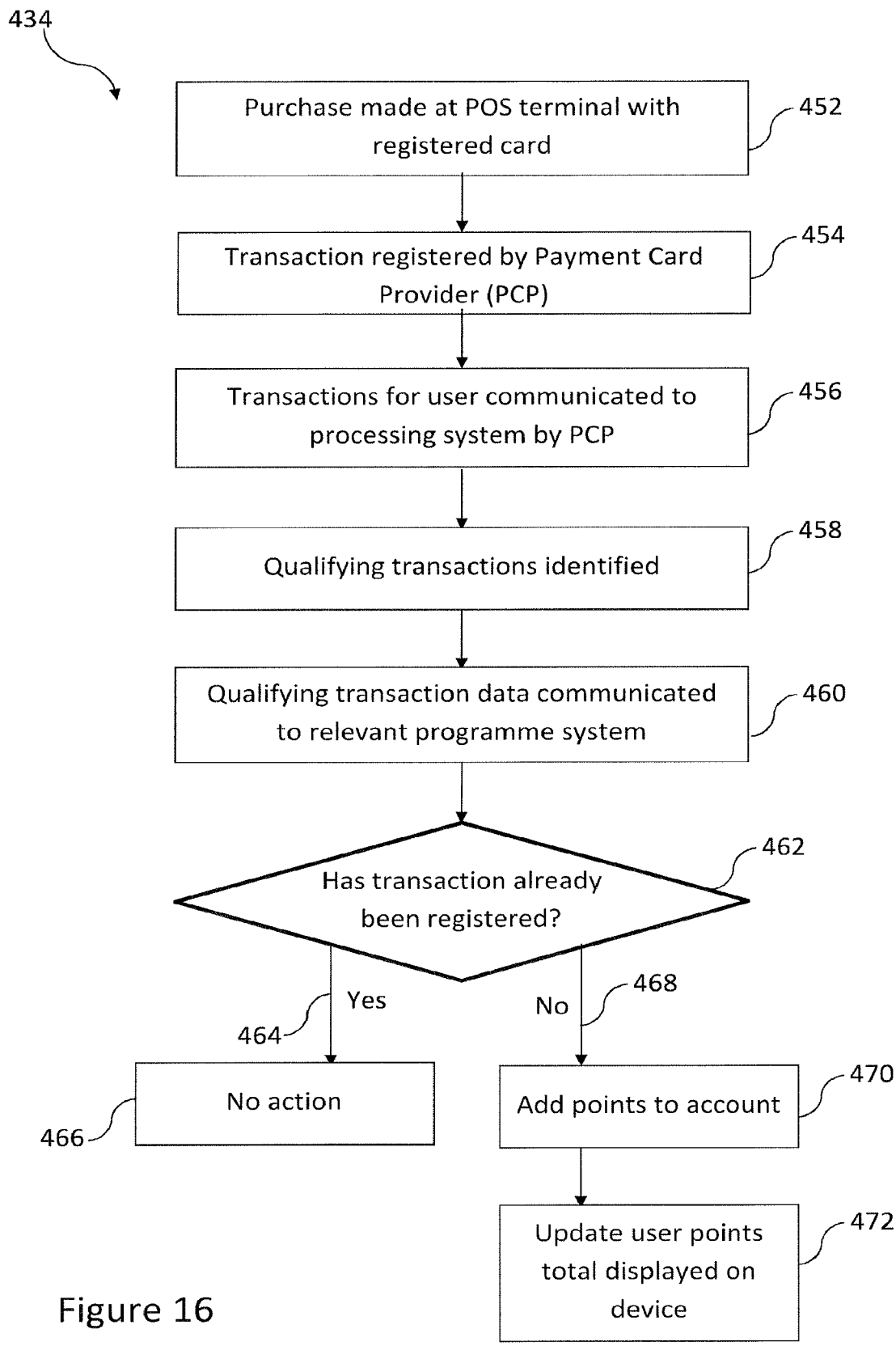
FIG. 16 is a flow chart showing a method of matching transactions made with a registered payment card to a loyalty token user account using the processing system of FIGS. 6a to 6c.

The transaction matching process 434, as outlined in FIG. 16, is implemented as follows. The user initially makes 452 a purchase at a POS terminal 48 with a registered payment card. The POS terminal 48 is associated with a particular token type or scheme provider. The transaction is encrypted and registered 454 with the PCP 44 via a communications network 32.

Because the PSP 46 provided the PCP 44 with the PAN, TPAN, and CID, the PCP can transfer 456 transactions and additional data relevant to the registered card directly to the central processing system 36 or allow it to access this data separately upon request. The data made accessible to the central processing system 36 comprises at least: the CID; the TPAN; a merchant ID (MID) used to identify the retailer and/or loyalty card programme provider with whom the transaction was made; the value of the transaction; the transaction date (TDate); the posting date (PDate) of the transaction; the currency of the transaction; and the location that the transaction was made.

In the method 434 of FIG. 16, the central processing system 36 accesses the above data, and the merchant ID of each transaction is compared with T1 schemes, regardless of whether the user is enrolled in the scheme and owns the relevant user token or not, and any qualifying transactions are identified 458. If a transaction was made at a POS terminal 48 that is associated with a merchant ID of a partner system 50, and the user is enrolled in the scheme associated with that partner and has registered the relevant user token using the consumer application 112, the central processing system 36 communicates 460 the TokenID, the CID, the TPAN, the MID, the value of the transaction, and the transaction date to the partner system.

The partner system uses this data to match 462 the transaction with a Basket ID (BID). If the transaction does have a corresponding BID, it is determined whether points were assigned for the transaction or not. If points have 464 been assigned for the transaction, no action 466 is taken. If points have not 468 been assigned for the transaction, the partner database is updated 470 before a new points balance is returned to the central processing system 36 so that the user accounts database 158 can be updated. The updated points balance will be displayed 472 to the user when the consumer application 112 is next used and the user device 34 on which the application runs is connected to the internet.

If a transaction is successfully matched to a user token type owned by the user, data is securely transferred to the partner. Consequently, if a transaction to a partner system is made with one of their registered payment cards, reward points are automatically assigned to the user's account for each programme they are enrolled in or token they own and have registered. This means that the user does not need to present their user token at the point of sale in the future, as long as they use a registered payment card to make the payment.

In the event that they use a payment card that is not registered or they use cash to make the purchase, the consumer application has the ability to reproduce a barcode that may be presented at the point of sale in order for the user to gain points for both T1 and T2 user tokens.

If a transaction is matched to a T1 user token that the user is not enrolled in, the application alerts the user to this fact. The user may then be presented with a potential points balance, and an equivalent monetary value. The T1 partnership that exists allows the system to enroll the user into the programme via the consumer application. The user may not be required to enter extra information as the user's registration information can be transferred to the partner system for this purpose.

Speed of Operation Examples

Below are examples of 'post' and 'response' coding in development example calls. The post is the request for identification of a loyalty card received at the processor. The response in a JSON format has been modified to show the identity of the card, seen as "scheme_id". Below the post and response coding are examples of performance for several different cards (tokens). Each of the timings is shown in seconds for identification of the card at the central processing system and the timings do not include network latency.

Post:

```
curl -X POST
    -H "Content-Type: application/json"
    -H "Authorization: Token
eyJhbGci0iJIUzI1NiIsInR5cCI6IkpXVCJ9.eyJzdWIi0jUyLCJpYXQi0jE0NzEyNzIzNDJ9
.Gtvlv5vv31PdKqIW-Cx__fn__Jr0z24e0Z0Mk-xxxxxx" -H "Cache-Control: no-cache"
    -H "Postman-Token: 7be4a0c2-51ff-eef9-d2f1-2c5a2275e129"
    -d '{"base64img": "{{base64encoded image}}"}'
"http://dev.hermes.chingrewards.com/schemes/identify/"
```

Response:

```
{
    "status": "success",
    "membership_number": "",
    "reason": "",
    "type": "classify",
    "scheme_id": "my_waitrose_ref.jpg"
}
```

Example Performance (Seconds):

```
{"status": "success", "membership_number": "", "reason": "", "type": "classify", "scheme_id": "debenhams_beautycard_ref.jpg"} 0.0229918956757
{"status": "success", "membership_number": "", "reason": "", "type": "classify", "scheme_id": "harrods_ref.jpg"} 0.0260310173035
{"status": "success", "membership_number": "", "reason": "", "type": "classify", "scheme_id": "superdrug_beautycard_3_ref.jpg"} 0.0290660858154
{"status": "success", "membership_number": "", "reason": "", "type": "classify", "scheme_id": "costa_4_ref.jpg"} 0.0283770561218
{"status": "success", "membership_number": "", "reason": "", "type": "classify", "scheme_id": "sparks_2_ref.jpg"} 0.0258159637451
{"status": "success", "membership_number": "", "reason": "", "type": "classify", "scheme_id": "b_and_q_ref.jpg"} 0.0210869312286
{"status": "success", "membership_number": "", "reason": "", "type": "classify", "scheme_id": "superdrug_beautycard_ref.jpg"} 0.0158619880676
{"status": "success", "membership_number": "", "reason": "", "type": "classify", "scheme_id": "the_works_2_ref.jpg"} 0.0329420566559
{"status": "success", "membership_number": "", "reason": "", "type": "classify", "scheme_id": "m_and_co_ref.jpg"} 0.0268819332123
{"status": "success", "membership_number": "", "reason": "", "type": "classify", "scheme_id": "morrisons_match_and_more_ref.jpg"} 0.0263860225677
{"status": "success", "membership_number": "", "reason": "", "type": "classify", "scheme_id": "avios_ref.jpg"} 0.0689659118652
{"status": "success", "membership_number": "", "reason": "", "type": "classify", "scheme_id": "jamies_italian_gold_club_ref.jpg"} 0.0417749881744
```

Here the speed of identification is magnitudes of times faster than a conventional image comparison technique. Furthermore, the minimum number of features required to be matched (30 in this embodiment) provides an optimum in terms of speed and reliability. If this value is decreased for example the speed of matching would not drastically change, however the reliability of the process in correctly identifying the correct user token type would reduce. Increasing this minimum level significantly would increase the time taken to reach a result to a level where the benefits of the process would reduce.

Many modifications may be made to the above examples without departing from the spirit and scope of the present invention as defined in the accompanying claims. For example elements described in one embodiment may also be used in other embodiments as will be apparent to the skilled person even though such combinations have not explicitly been shown above.

The invention claimed is:

1. A loyalty management system for linking together the operation of payment instruments and loyalty user accounts, the system comprising:
   a user account database; and
   a loyalty management server configured to:
   receive transaction information, from a payment service provider or payment network provider, pertaining to one or more processed payment transactions involving the payment instrument, the transaction information comprising data indicating the payment instrument that is based on a unique payment identifier for the payment instrument;
   access a data record in the user account database, the data record being associated with the data indicating the payment instrument;
   retrieve data indicating a loyalty user account from the data record, the data being based on a unique loyalty identifier for the loyalty user account; and
   send a transaction-notifying message to a loyalty account system for updating the loyalty user account held at the loyalty account system.

2. The system of claim 1, wherein the unique payment identifier comprises a primary account number (PAN) of the payment instrument.

3. The system of claim 2, wherein the data indicating the payment instrument comprises a tokenised identifier, consisting of non-sensitive data, and a truncated PAN.

4. The system of claim 1, wherein the unique loyalty identifier comprises a membership number of a loyalty user card associated with the loyalty user account.

5. The system of claim 1, wherein the transaction information comprises at least: a merchant identifier; a value of the processed payment transaction; and a payment transaction date or time.

6. The system of claim 5, wherein the loyalty management server is configured to determine the loyalty account system and to retrieve the data indicating the loyalty user account based on the merchant identifier or on the unique loyalty identifier.

7. The system of claim 1, wherein the transaction-notifying message includes at least part of the data indicating the loyalty user account for enabling the loyalty account system to identify the user account and a transaction identifier.

8. The system of claim 1, wherein the loyalty management server is configured to:
   identify qualifying payment transactions by comparing a merchant identifier in the transaction information with known merchant identifiers, the transaction-notifying message comprising at least some of the identified qualifying transactions.

9. The system of claim 8, wherein the loyalty management server is configured to:
   perform a transaction-matching process in which the qualifying payment transactions are compared with one or more retail transactions.

10. A loyalty management system for linking together the operation of payment instruments and loyalty user accounts, the system comprising:
    a user account database; and
    a loyalty management server configured to:
    receive transaction information pertaining to one or more payment transactions involving the payment instrument, the transaction information comprising data indicating the payment instrument that is based on a unique payment identifier for the payment instrument
    access a data record in the user account database, the data record being associated with the data indicating the payment instrument;
    retrieve data indicating a loyalty user account from the data record, the data being based on a unique loyalty identifier for the loyalty user account send a transaction-notifying message to a loyalty account system for updating the loyalty user account held at the loyalty account system;

wherein the loyalty management server is configured to:

receive, from a data extraction system, the unique payment identifier for the payment instrument;

communicate the unique payment identifier to the payment service provider, the payment service provider communicating with a payment card provider or payment network provider to enable the payment card provider or payment network provider to send the transaction information;

receive, in response from the payment service provider, the data indicating the payment instrument comprising a tokenised identifier and a truncated PAN; and update a data record in the user accounts database according to the received data.

11. The system of claim 1, comprising a data extraction processing system configured to:

receive, from a user device, data comprising the unique loyalty identifier; and extract the unique loyalty identifier from the received data.

12. A method for linking together the operation of payment instruments and loyalty user accounts, the method comprising:

receiving, at a loyalty management server, transaction information, from a payment service provider or payment network provider, pertaining to a processed payment transaction involving the payment instrument, the transaction information comprising data indicating the payment instrument that is based on a unique payment identifier for the payment instrument;

accessing a data record in a user account database, the data record being associated with the data indicating the payment instrument;

retrieving data indicating the loyalty user account from the data record, the data being based on a unique loyalty identifier for the loyalty user account; and sending a transaction-notifying message to a loyalty account system for updating the loyalty user account held at the loyalty account system.

13. The method of claim 12, wherein the unique payment identifier comprises a primary account number (PAN) of the payment instrument, and wherein the unique loyalty identifier comprises a membership number of a loyalty user card associated with the loyalty user account.

14. The method of claim 12, wherein the transaction information comprises a merchant identifier, and wherein the method further comprises determining the loyalty account system and retrieving the data indicating the loyalty user account based on the merchant identifier.

15. The method of claim 12, comprising identifying qualifying payment transactions by comparing a merchant identifier in the transaction information with known merchant identifiers, the transaction-notifying message comprising at least some of the identified qualifying transactions.

16. The method of claim 15, comprising performing a transaction-matching process in which the qualifying payment transactions are compared with one or more retail transactions associated with the loyalty user account.

17. The method of claim 12, wherein the transaction-notifying message includes the loyalty account identifier and, a transaction identifier and/or a transaction value.

18. A method for linking together the operation of payment instruments and loyalty user accounts, the method comprising:

receiving, at a central processing system, transaction information, from a payment service provider or payment network provider, pertaining to a processed payment transaction involving a payment instrument;

determining a loyalty account system associated with a merchant identifier;

determining, from a data record of a user account database, a loyalty user account for the loyalty account system that is associated with the payment instrument;

communicating, to the determined loyalty account system, a data packet comprising data indicating the loyalty user account and at least some of the transaction information;

determining loyalty points for the processed payment transaction; and updating a points total in the user account.

19. The method of claim 18, wherein the transaction information communicated to the determined loyalty account system includes a transaction identifier.

20. A method for linking together the operation of payment instruments and loyalty user accounts, the method comprising:

receiving, at a central processing system, transaction information pertaining to a transaction involving a payment instrument determining a loyalty account system associated with the merchant identifier;

determining, from a data record of a user account database, a loyalty user account for the loyalty account system that is associated with the payment instrument communicating, to the determined loyalty account system, a data packet comprising data indicating the loyalty user account and at least some of the transaction information;

determining loyalty points for the payment transaction;

updating a points total in the user account and, determining whether loyalty points were assigned for the transaction by comparing the data packet with data relating to the user account, and performing the determining and updating steps if loyalty points were not assigned for the transaction.

* * * * *